United States Patent [19]

Furuhashi et al.

[11] 4,296,722

[45] Oct. 27, 1981

[54] CONTROL APPARATUS FOR AN INTERNAL COMBUSTION ENGINE

[75] Inventors: Toshio Furuhashi; Osamu Abe, both of Ibaraki, Japan

[73] Assignee: Hitachi, Ltd., Tokyo, Japan

[21] Appl. No.: 60,751

[22] Filed: Jul. 26, 1979

[30] Foreign Application Priority Data

Jul. 26, 1978 [JP] Japan .................................. 53-90432

[51] Int. Cl.3 ......................... F02B 3/10; G06F 15/20

[52] U.S. Cl. .................................... 123/492; 123/478; 123/480; 364/431

[58] Field of Search ........ 123/32 EL, 32 EH, 32 EA, 123/32 EB, 32 EC, 117 R, 117 D, 417; 364/431

[56] References Cited

U.S. PATENT DOCUMENTS

| | | | |
|---|---|---|---|
| 3,816,717 | 6/1974 | Yoshida et al. | 123/32 EB |
| 3,835,819 | 9/1974 | Anderson, Jr. | 123/117 D |
| 4,116,169 | 9/1978 | Krupp et al. | 123/32 EC |
| 4,176,625 | 12/1979 | Stauffer | 123/32 EH |
| 4,181,944 | 1/1980 | Yamauchi et al. | 123/32 EA |
| 4,244,023 | 1/1981 | Johnson | 123/417 |

FOREIGN PATENT DOCUMENTS

| | | | |
|---|---|---|---|
| 2812327 | 9/1978 | Fed. Rep. of Germany | 123/117 D |
| 2845354 | 4/1979 | Fed. Rep. of Germany | 123/117 D |

*Primary Examiner*—P. S. Lall

*Attorney, Agent, or Firm*—Craig and Antonelli

[57] ABSTRACT

A control apparatus for an internal combustion engine in which a plurality of sensors are provided to detect operating conditions of the engine and the detected signals are converted into digital signals for the arithmetic operation executed in a central processor. This apparatus includes a register for storing data supplied from the central processor, a counter for counting up pulses produced each time the engine rotates a fixed crank angle, and a comparator for producing an output when a count value of the counter becomes equal to or greater than the data set in the register. A logic circuit is provided to produce a control pulse on the basis of the output of the comparator for the control of fuel injection. Upon the detection of conditions to correct the quantity of fuel injected into the engine, such as during acceleration, the data to be set into the register is changed.

13 Claims, 28 Drawing Figures

FIG. 6

| STAGE PULSE | STAGE CTR | | | | | | | | | |
|---|---|---|---|---|---|---|---|---|---|---|
| | $C_9$ | $C_8$ | $C_7$ | $C_6$ | $C_5$ | $C_4$ | $C_3$ | $C_2$ | $C_1$ | $C_0$ |
| INTL-P | X | X | X | X | X | X | X | 0 | 0 | 1 |
| CYL-P | X | X | X | X | X | X | X | 0 | 1 | 0 |
| ADV-P | X | X | X | X | X | X | X | 0 | 1 | 1 |
| DWL-P | X | X | X | X | X | X | X | 1 | 0 | 0 |
| RPM-P | X | X | X | X | X | X | X | 1 | 0 | 1 |
| VSP-P | X | X | X | X | X | X | X | 1 | 1 | 0 |
| RPMW-P | X | X | X | 0 | 0 | 1 | 0 | 0 | 0 | 0 |
| EGRP-P | X | X | 0 | 0 | 1 | 1 | 0 | 0 | 0 | 0 |
| EGRD-P | X | X | 1 | 0 | 1 | 1 | 0 | 0 | 0 | 0 |
| NIDLP-P | X | X | 0 | 1 | 0 | 1 | 0 | 0 | 0 | 0 |
| NIDLD-P | X | X | 1 | 1 | 0 | 1 | 0 | 0 | 0 | 0 |
| ENST-P | 0 | 1 | 0 | 0 | 0 | 0 | 0 | 0 | 0 | 0 |
| VSPW-P | 1 | 0 | 0 | 0 | 0 | 0 | 0 | 0 | 0 | 0 |
| INTV-P | 1 | 1 | 0 | 0 | 0 | 0 | 0 | 0 | 0 | 0 |
| INTVR-P | 0 | 0 | 0 | 0 | 0 | 0 | 0 | 0 | 0 | 0 |
| INJ-P (IF TREG=000) | X | X | X | X | X | X | X | 1 | 1 | 1 |
| INJ-P (IF TREG=001) | X | X | X | X | X | X | 0 | 1 | 1 | 1 |
| INJ-P (IF TREG=010) | X | X | X | X | X | 0 | 0 | 1 | 1 | 1 |
| INJ-P (IF TREG=011) | X | X | X | X | 0 | 0 | 0 | 1 | 1 | 1 |
| INJ-P (IF TREG=100) | X | X | X | 0 | 0 | 0 | 0 | 1 | 1 | 1 |
| INJ-P (IF TREG=101) | X | X | 0 | 0 | 0 | 0 | 0 | 1 | 1 | 1 |
| STAGE0-P | X | X | X | X | X | X | X | 0 | 0 | 0 |
| STAGE7-P | X | X | X | X | X | X | X | 1 | 1 | 1 |

CONTROL APPARATUS FOR AN INTERNAL COMBUSTION ENGINE

BACKGROUND OF THE INVENTION

This invention relates generally to a control apparatus for an internal combustion engine and particularly to an apparatus for controlling an amount of fuel to be injected into the internal combustion engine when an automotive vehicle is accelerated.

In a conventional internal combustion engine, a fuel injection valve is controlled to open for a predetermined period of time under the condition of normal running of the automotive vehicle in synchronism with a signal detected by means of a crank angle sensor. The fuel injection performed at the normal running of the vehicle is hereinafter referred to as a normal fuel injection. When an automotive vehicle is accelerated, it is desirable to increase the amount of injected fuel as compared with the normal running. For this purpose, the valve is usually controlled to open immediately after the shift from the normal running of the automotive vehicle to the acceleration running is detected. This fuel injection performed during acceleration is hereinafter referred to as a corrective fuel injection. According to a conventional method, however, the corrective fuel injection is sometimes instructed to take place simultaneously with the normal fuel injection since the timing of the corrective fuel injection cannot be controlled. In a case where the instruction signal for the corrective fuel injection is delivered at substantially the same time as that for the normal fuel injection, the amount of fuel injected into the internal combustion engine remains unchanged as compared to the amount of fuel at the normal running. In other words, even though the instruction signal is delivered in order to increase the amount of fuel to be injected, the actual amount of injected fuel into the internal combustion engine sometimes remains unchanged so that the characteristic of acceleration of the automotive vehicle is unsatisfactory.

SUMMARY OF THE INVENTION

The principal object of the present invention resides in providing a control apparatus for an internal combustion engine wherein the fuel injection control can be achieved in such a manner that the corrective fuel injection always takes place at timings different from the normal fuel injection.

According to the present invention, there is provided a counter which counts up pulses generated by a crank angle sensor, a register into which predetermined data is set from a processor unit, and a comparator for comparing the count value of the counter with the set data of the register to produce an output pulse used for the fuel injection control. The feature of the invention resides in providing means for changing the data to be set into the register, upon detection of the condition that the automotive vehicle is to be accelerated.

The other objects, features and advantages of the present invention will become more apparent from a detailed description of embodiments of the invention when read in conjunction with the drawings.

BRIEF DESCRIPTION OF THE DRAWINGS

FIG. 6 is a table showing the relation between stage pulses and the contents of a stage counter;

DETAILED DESCRIPTION OF THE PREFERRED EMBODIMENTS

Figure 1:
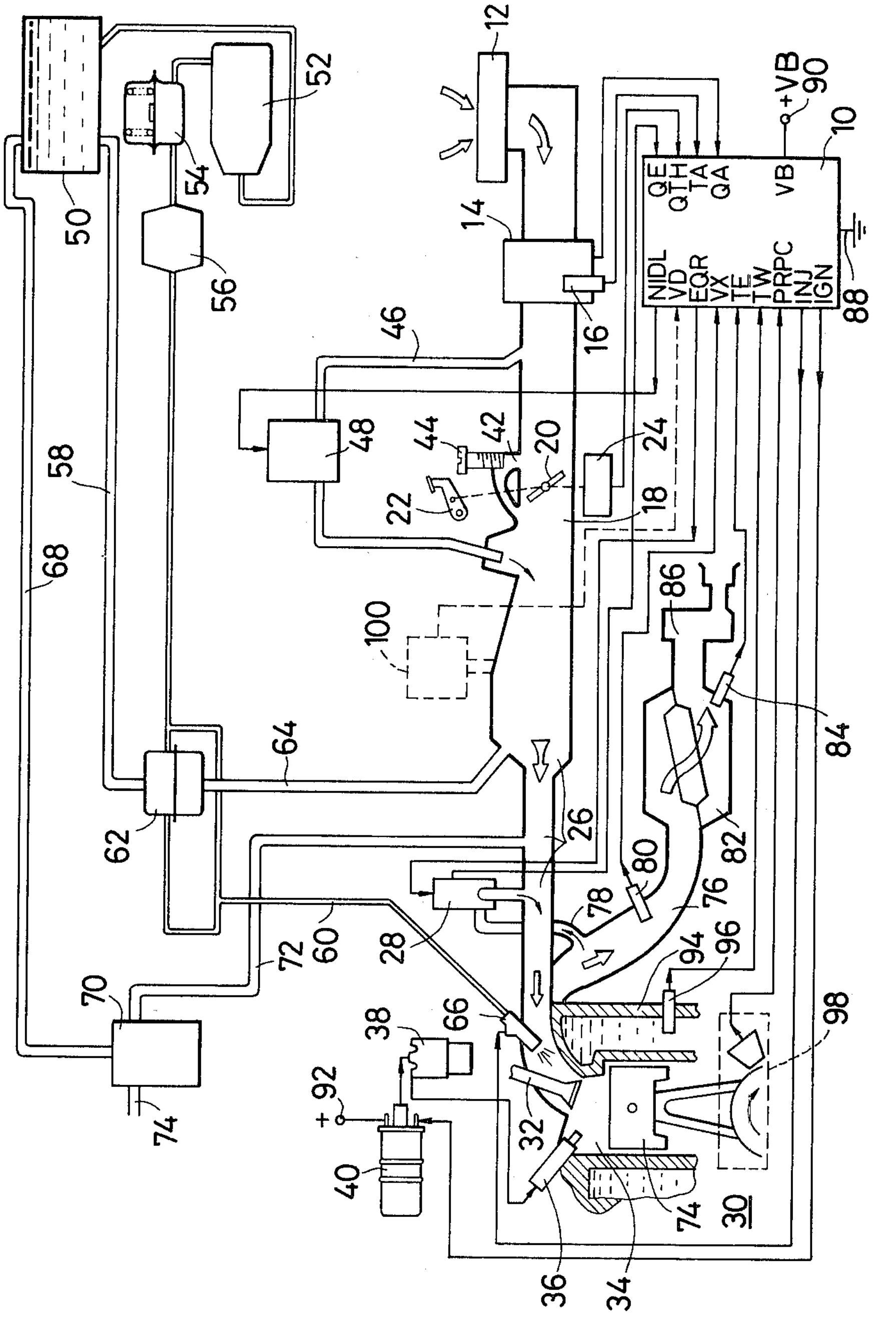
FIG. 1 is a diagram showing an engine control system for a fuel-injected, internal combustion engine.

An embodiment of this invention will now be described with reference to FIG. 1 showing a system diagram of an electronic engine control apparatus. Air taken in through an air cleaner 12 has its flow rate measured by an air flow meter 14, from which an output signal QA representative of the quantity of flow of the air is supplied to a control circuit 10. The air flow meter 14 is provided with a temperature sensor 16 for detecting the temperature of the suction air, and an output signal TA representative of the temperature of the suction air is also supplied into the control circuit 10.

The air having passed through the air flow meter 14 passes through a throttle chamber 18, and is sucked from an intake manifold 26 through a suction valve 32 into a combustion chamber 34 of an engine 30. The quantity of air to be sucked into the combustion chamber 34 is controlled by varying the degree of opening of a throttle valve 20 disposed within a throttle chamber in mechanical connection with an accelerator pedal 22. The angular position of the throttle valve 20 is detected by a throttle position detector 24. A signal QTH representative of the position of the throttle valve 20 is supplied by the throttle position detector 24 to the control circuit 10.

The throttle chamber 18 is provided with a bypass passage 42 for idling and an idle adjust screw 44 for adjusting the quantity of air to pass through the bypass passage 42. Where the engine is operating in the idling state, the throttle valve 20 is fully closed. The suction air from the air flow meter 14 flows through the bypass passage 42, and is sucked into the combustion chamber 34. Accordingly, the quantity of suction air in the idling operation state is varied by the adjustment of the idle adjustment screw 44. Since energy to be generated in combustion chamber 34 is substantially determined by the quantity of air from the bypass passage 42, the engine revolution velocity in the idling state can be adjusted to an appropriate value by adjusting the idle adjustment screw 44, thus varying the quantity of suction air into the engine.

The throttle chamber 18 is further provided with another bypass passage 46 and an air regulator 48. The air regulator 48 controls the quantity of air to pass through the passage 46 in response to an output signal NIDL from control circuit 10, to control the engine revolution velocity during engine warm-up and the supply of appropriate quantity of air to the engine for a sudden change of the throttle valve 20. If necessary, the flow rate of air during the idling operation can also be varied.

Now, the fuel feed system will be described. Fuel stored in a fuel tank 50 is drawn into a fuel pump 52, and is fed under pressure to a fuel damper 54. The fuel damper 54 absorbs the pressure pulsation of the fuel from the fuel pump 52 so as to feed fuel of a predetermined pressure to a fuel pressure regulator 62 through a fuel filter 56. The fuel from the fuel pressure regulator 62 is fed under pressure to a fuel injector 66 through a fuel pipe 60. In response to an output signal INJ from the control circuit 10, the fuel injector 66 is opened to inject the fuel into the engine.

The quantity of fuel injected from the fuel injector 66 is determined by the valve opening time of the injector 66 and the difference between the pressure of the fuel fed under pressure to the injector 66 and the pressure of the intake manifold 26 into which the fuel is injected. It is desirable, however, that the quantity of fuel injection from the fuel injector 66 depend only on the valve opening time which is determined by the signal from the control circuit 10. Therefore, the pressure of the fuel feed to the fuel injector 66 is controlled by the fuel pressure regulator 62 so that the difference between the fuel pressure to the fuel injector 66 and the manifold pressure of the intake manifold 26 may be constant at all times. The intake manifold pressure is coupled to the fuel pressure regulator 62 through a pressure conduit 64. When the fuel pressure in the fuel pipe 60 becomes a certain value higher than this intake manifold pressure, the fuel pipe 60 and a fuel return pipe 58 communicate with each other, and fuel corresponding to the excess pressure is returned to the fuel tank 50 through the fuel return pipe 58. In this way, the difference between the fuel pressure in the fuel pipe 60 and the manifold pressure in the intake manifold 26 is always held constant.

The fuel tank 50 is further provided with a pipe 68 and a canister 70 for absorbing gases with the vaporized fuel. During the operation of the engine, air is drawn in from an atmospheric air port 74, and the absorbed fuel gas is fed to the intake manifold 26 by a pipe 72 and then to the engine 30.

As explained above, fuel is injected from the fuel injector 66, and the suction valve 32 is opened in synchronism with the motion of a piston 74, so that a mixture consisting of the air and the fuel is led to the combustion chamber 34. The mixture is compressed and is ignited by spark energy from an ignition plug 36, whereby the combustion energy of the mixture is converted into kinetic energy for moving the piston.

The burnt mixture is emitted from an exhaust valve (not shown) through an exhaust pipe 76, a catalytic converter 82, and a muffler 86 to the atmosphere as exhaust gas. The exhaust pipe 76 is provided with an exhaust gas recirculation pipe 78 (hereinbelow abbreviated to EGR pipe), through which part of the exhaust gas is led to the intake manifold 26. That is, part of the exhaust gas is returned to the suction side of the engine. The quantity of recirculated gas is determined by the valve opening degree of an exhaust gas recirculator 28. The valve opening degree is controlled by an output signal EGR of the control circuit 10. Further, the valve position of the exhaust gas recirculator 28 is converted into an electric signal and is supplied to the control circuit 10 as a signal QE.

In the exhaust pipe 76, there is provided a so-called λ sensor 80, which detects the mixing ratio of the mixture sucked in the combustion chamber 34. As the λ sensor 80, an $O_2$ sensor (oxygen sensor) is ordinarily used, and it detects an oxygen concentration in the exhaust gas and generates a voltage $V_\lambda$ responsive to the oxygen concentration. The output $V_\lambda$ of the λ sensor 80 is supplied to the control circuit 10. The catalytic converter 82 is provided with an exhaust gas temperature sensor 84, the output signal TE of which corresponding to the exhaust gas temperature is supplied to the control circuit 10.

The control circuit 10 is coupled via a negative terminal 88 and a positive terminal 90 to a power source +VB. Further, a signal IGN for controlling the sparking of the foregoing ignition plug 36 is applied to the primary coil of an ignition coil 40 from the control circuit 10, and a high voltage generated in the secondary coil thereof is applied to the ignition plug 36 through a distributor 38, so that sparks for combustion are generated within the combustion chamber 34. More specifically, the ignition coil 40 is coupled via a positive terminal 92 to the power source +VB and the control circuit 10 is provided with a power transistor (not shown) for controlling the primary coil current of the ignition coil 40. A series circuit consisting of the primary coil of the ignition coil 40 and the power transistor is formed between the positive power source terminal 92 of the ignition coil 40 and the negative power source terminal 88 of the control circuit 10. By rendering the power transistor conductive, electromagnetic energy is stored in the ignition coil 40, and by rendering the power transistor nonconductive, the electromagnetic energy is applied to the ignition plug 36 as energy having a high voltage.

The engine 30 is provided with a water temperature sensor 96, which detects the temperature of engine coolant 94 and a signal TW thus detected is applied to the control circuit 10. Further, the engine 30 is provided with an angle sensor 98 for detecting the rotational position of the engine. By means of the sensor 98, a reference signal PR is generated every 120°, for example, in synchronism with the rotation of the engine, and an angle signal PC is generated each time the engine is rotated by a predetermined angle (e.g. 0.5°). These signals PR and PC are supplied to the control circuit 10.

In the system of FIG. 1, a negative pressure sensor may be used instead of the air flow meter 14. A component 100 indicated by dotted lines in the figure is the negative sensor, from which a voltage VD corresponding to the negative pressure of the intake manifold 26 is produced and supplied to the control circuit 10.

As the negative pressure sensor 100, a semiconductor negative pressure sensor may be used in which the boost pressure of the intake manifold is caused to act on one side of a silicon chip, while the atmospheric pressure or a fixed pressure is caused to act on the other side. A vacuum may be used in some cases. With such a structure, the voltage VD corresponding to the manifold pressure is generated by the action of the piezo-resistive effect or the like and is applied to the control circuit 10.

Figure 2:
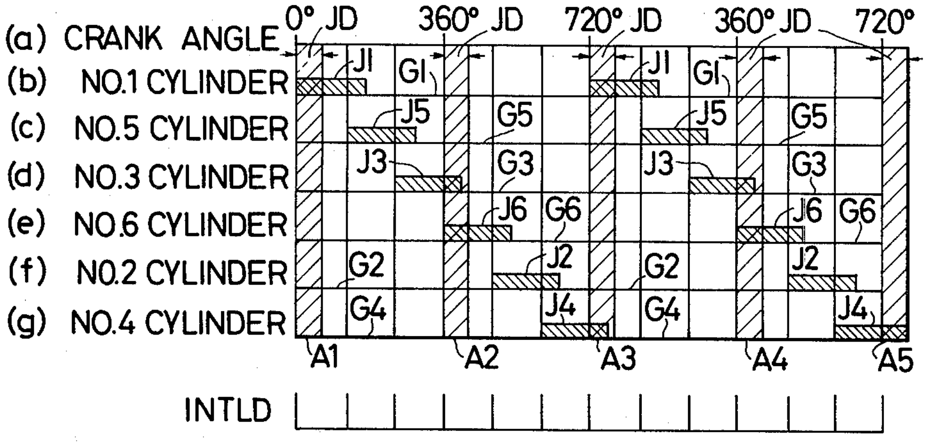
FIG. 2 shows timings of fuel injection and ignition with respect to crank angle.

FIG. 2 is an operational diagram for explaining the ignition timing and the fuel injection timing of a six-cylinder engine versus the crank angle. In the figure, (a) represents the crank angle. The reference signal PR is provided from the angle sensor 98 for every 120° of the crank angle. That is, the reference signal PR is applied to the control circuit 10 every 0°, 120°, 240°, 360°, 480°, 600°, or 720° of the crank angle.

In FIG. 2, lines (b), (c), (d), (e), (f), and (g) illustrate the operations of the first cylinder, the fifth cylinder, the third cylinder, the sixth cylinder, the second cylinder, and the fourth cylinder, respectively. J1 through J6 represent the valve opening positions of the suction valves of the respective cylinders. As shown in FIG. 2, the valve opening positions of the respective cylinders are shifted by 120° in terms of the crank angle. Although the valve opening positions and the valve opening widths differ to some extent in dependence on each engine structure, they are substantially as indicated in the figure.

Reference symbols A1 through A5 in the figure indicate the valve opening timings or fuel injection timings of the fuel injector 66. The time width JD of each of the injection timings A1 through A5 represents the valve opening time of the fuel injector 66. The time width JD can be considered as representing the quantity of fuel injected from the fuel injector 66. The fuel injectors 66 are disposed in correspondence with the respective cylinders, and they are connected in parallel with a driver circuit within the control circuit 10. Accordingly, the fuel injectors 66 corresponding to the respective cylinders open the valves and inject fuel at each occurrence of the signal INJ from the control circuit 10.

Operation will be explained with reference to the first cylinder illustrated in FIG. 2. In synchronism with the reference signal INTLD generated at 120° of the crank angle, (the relationship in timing between PR and INTLD will be explained later) output signal INJ is applied from the control circuit 10 to the fuel injectors 66 which are disposed at the manifolds or suction ports of the respective cylinders. Thus, fuel is injected as shown at A2 for the period of time JD calculated by the control circuit 10. Since, however, the first cylinder has its suction valve closed, the injected fuel is held near the suction port of the first cylinder and is not sucked into the cylinder. In response to the reference signal INTLD arising at the point 720° of the crank angle, the signal is sent from the control circuit to the fuel injectors 66 again, and the fuel injection shown at A3 is carried out. At substantially the same time as the injection, the suction valve of the first cylinder is opened. Upon this valve opening, both the fuel injected at A2 and the fuel injected at A3 are sucked into the combustion chamber. The same applies to the other cylinders. That is, in the fifth cylinder illustrated in (c), fuel quantities injected at A2 and A3 are sucked in at the valve opening position J5 of the suction valve. In the third cylinder illustrated in (d), part of the fuel injected at A2, the fuel injected at A3 and part of the injected fuel at A4 are sucked in at the valve opening position J3 of the suction valve. When the part of the fuel injected at A2 and the part of the fuel injected at A4 are put together, they become the quantity of injection corresponding to one injecting operation. Also, in each suction stroke of the third cylinder, the quantity of injection corresponding to two injecting operations is sucked in. Likewise, in the sixth cylinder, second cylinder, or fourth cylinder illustrated at (e), (f), or (g), respectively, the quantity of injection corresponding to two injecting operations of the fuel injector is sucked in by one suction stroke. As understood from the above explanation, the quantity of fuel injection assigned by the fuel injection signal INJ from the control circuit 10 is half the necessary fuel amount to be sucked in, and the necessary fuel amount corresponding to the air sucked into the combustion chamber 34 is obtained by two injecting operations of the fuel injector 66.

In FIG. 2, reference symbols G1 through G6 indicate ignition timings corresponding to the first cylinder through the sixth cylinder respectively. By rendering the power transistor disposed within the control circuit 10 nonconductive, the primary coil current of the ignition coil 40 is cut-off to generate the high voltage in the secondary coil. The generation of the high voltage is effected at the ignition timings G1, G5, G3, G6, G2, and G4, and power is distributed by the distributor 38 to the ignition plugs 36 disposed in the respective cylinders. Thus, the ignition plugs ignite in the order of the first cylinder, fifth cylinder, third cylinder, sixth cylinder, second cylinder, and fourth cylinder, and the mixture consisting of the fuel and the air burns.

Figure 3:
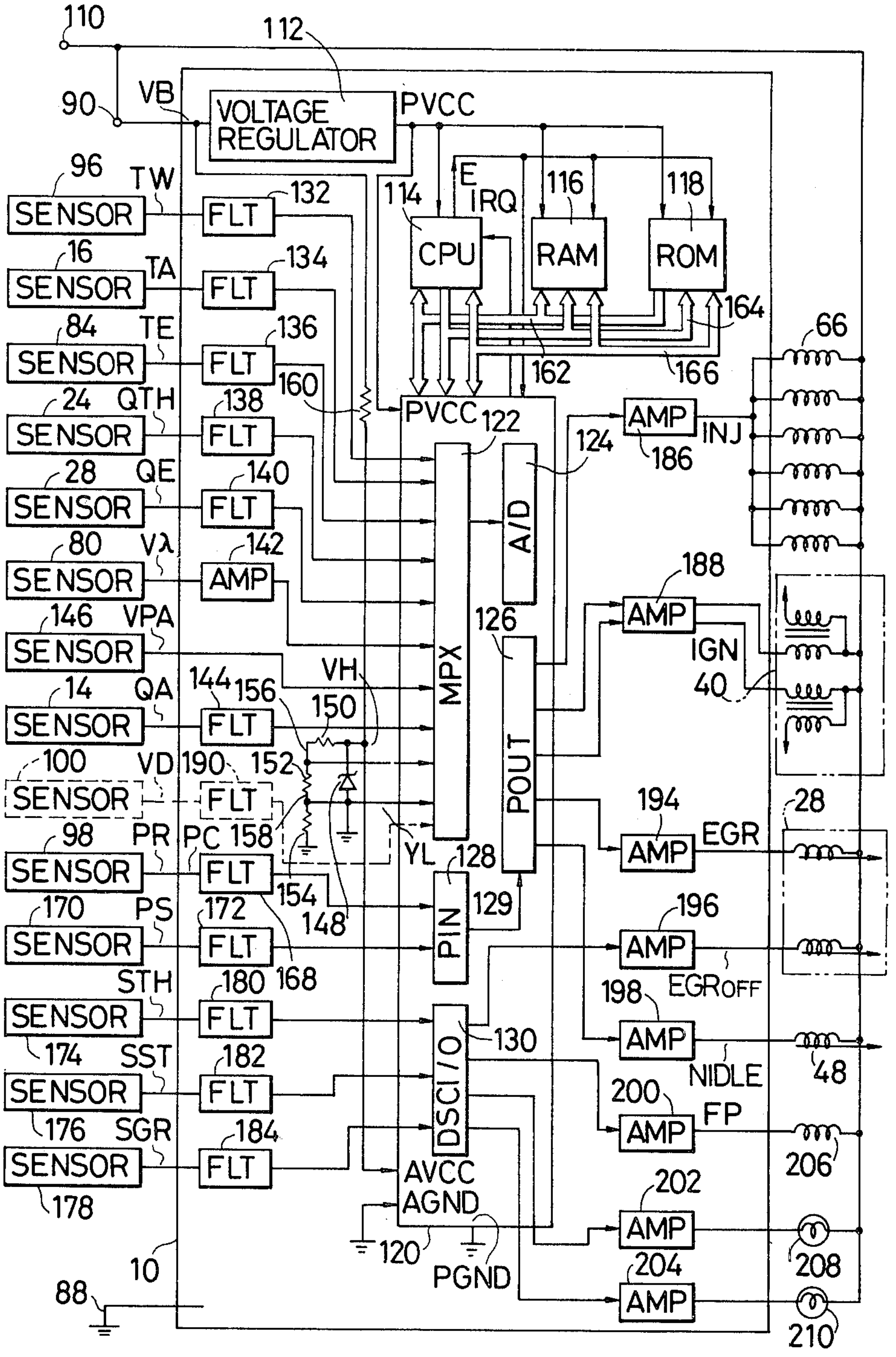
FIG. 3 is a block diagram showing a control unit of the engine control system shown in FIG. 1.

CONTROL UNIT (10):

A detailed circuit arrangement of the control circuit 10 in FIG. 1 is shown in FIG. 3. The positive power source terminal 90 of the control circuit 10 is connected to a plus terminal 110 of a battery and a voltage VB is supplied to the control circuit 10. The supply voltage VB is held constant at a fixed voltage PVCC, e.g. 5 V, by a voltage regulator circuit 112. The fixed voltage PVCC is supplied to a central processor 114 (hereinbelow abbreviated as CPU), a random access memory 116 (hereinbelow abbreviated as RAM), and a read only memory 118 (hereinbelow abbreviated as ROM). Further, the output PVCC of the voltage regulator circuit 112 is applied to an input/output circuit 120.

The input/output circuit 120 has a multiplexer 122, an analog/digital converter 124, a pulse output circuit 126, a pulse input circuit 128, and a discrete input/output circuit 130.

Analog signals are applied to the multiplexer 122 from the various sensors. One of the input signals is selected on the basis of a command from the CPU 114, and is coupled via multiplexer 122 to analog-to-digital converter 124. The analog input signals include the analog signal TW representative of the temperature of the cooling water of the engine, the analog signal TA representative of the suction temperature, the analog signal TE representative of the exhaust gas temperature, the analog signal QTH representative of the throttle opening, the analog signal QE representative of the valve opening state of the exhaust gas recirculator, the analog signal $V_\lambda$ representative of the excess air ratio of the sucked mixture and the analog signal QA representative of the quantity of sucked air, the signals being derived from the sensors shown in FIG. 1, i.e. the water temperature sensor 96, the suction temperature sensor 16, the exhaust temperature sensor 84, the throttle position detector 24, the exhaust gas recirculator 28, the sensor 80 and the air-flow meter QA, applied to the multiplexer 122 through filters 132, 134, 136, 138, 140 and 144, and the output $V_\lambda$ of the λ sensor 80 applied to the multiplexer through the amplifier 142, which includes a filter circuit.

In addition, an analog signal VPA representative of the atmospheric pressure is applied from an atmospheric pressure sensor 146 to the multiplexer 122. The voltage VB is supplied from the positive power source terminal 90 through a resistor 160 to a series circuit consisting of resistors 150, 152, and 154. Further, the terminal voltage of the series circuit composed of the resistors is kept constant by a zener diode 148. The values of voltages VH and VL at respective junctures 156 and 158 between the resistors 150 and 152 and the resistors 152 and 154 are applied to the multiplexer 122.

The CPU 114, RAM 116, ROM 118, and the input/output circuit 120 are respectively coupled to a data bus 162, an address bus 164, and a control bus 166. Further, an enabling signal E is applied from the CPU 114 to the RAM 116, the ROM 118, and the input/output circuit 120. In synchronism with the enabling signal E, the transmission of data through the data bus 162 is effected.

Signals representative of water temperature TW, suction air temperature TA, exhaust gas temperature TE, throttle opening QTH, quantity of exhaust gas recirculation QE, λ sensor output $V_\lambda$, atmospheric pressure VPA, quantity of suction air QA, reference voltage VH and VL, and negative pressure VD in place of the quantity of suction air QA are respectively supplied to multiplexer 122 of the input/output circuit 120. On the basis of an instruction program stored in the ROM 118, the CPU 114 assigns the addresses of these inputs through the address bus, and the analog inputs of the assigned addresses are stored. The analog inputs are sent from the multiplexer 122 to the analog-to-digital converter 124. The digital values from the analog-to-digital converter 124 are stored in registers corresponding to the respective inputs, and they are loaded into the CPU 114 or RAM 116 on the basis of instructions from the CPU 114 fed through the control bus 166, as may be needed.

The reference pulses PR and the angle signal PC are applied to the pulse input circuit 128 through a filter 168 from the angle sensor 98 in the form of pulse trains. Further, from a vehicular velocity sensor 170, pulses PS at a frequency corresponding to a vehicular velocity are applied to the pulse input circuit 128 through a filter 172 in the form of a pulse train.

Signals processed by the CPU 114 are held in the pulse output circuit 126. An output from the pulse output circuit 126 is applied to a power amplifier circuit 186, and the fuel injectors are controlled on the basis of the signal.

Shown at 188, 194, and 198 are power amplifier circuits, which respectively control the primary coil current of the ignition coil 40, the degree of opening of the exhaust gas recirculator 28, and the degree of opening of the air regulator 48 in response to the output pulses from the pulse output circuit 126. The discrete input/output circuit 130 receives and holds signals from a switch sensor 174 for detecting that the throttle valve 20 is in the fully closed state, a starter switch sensor 176 and a gear switch sensor 178 indicating that the transmission gear is a top gear, through filters 180, 182, and 184 respectively. Further, it stores the processed signals from the CPU 114. The signals with which the discrete input/output circuit 130 is concerned are signals each of which can have its content indicated by one bit. Subsequently, signals are sent from the discrete input/output circuit to power amplifier circuits 196, 200, 202, and 204 by the signals from the CPU 114. The amplified signals are used to close the exhaust gas recirculator 28 to stop the recirculation of the exhaust gas, control the fuel pump through 206, indicate an abnormal temperature of the catalyst through indicator 208 and indicate overheating of the engine through indicator 210, respectively.

Figure 4:
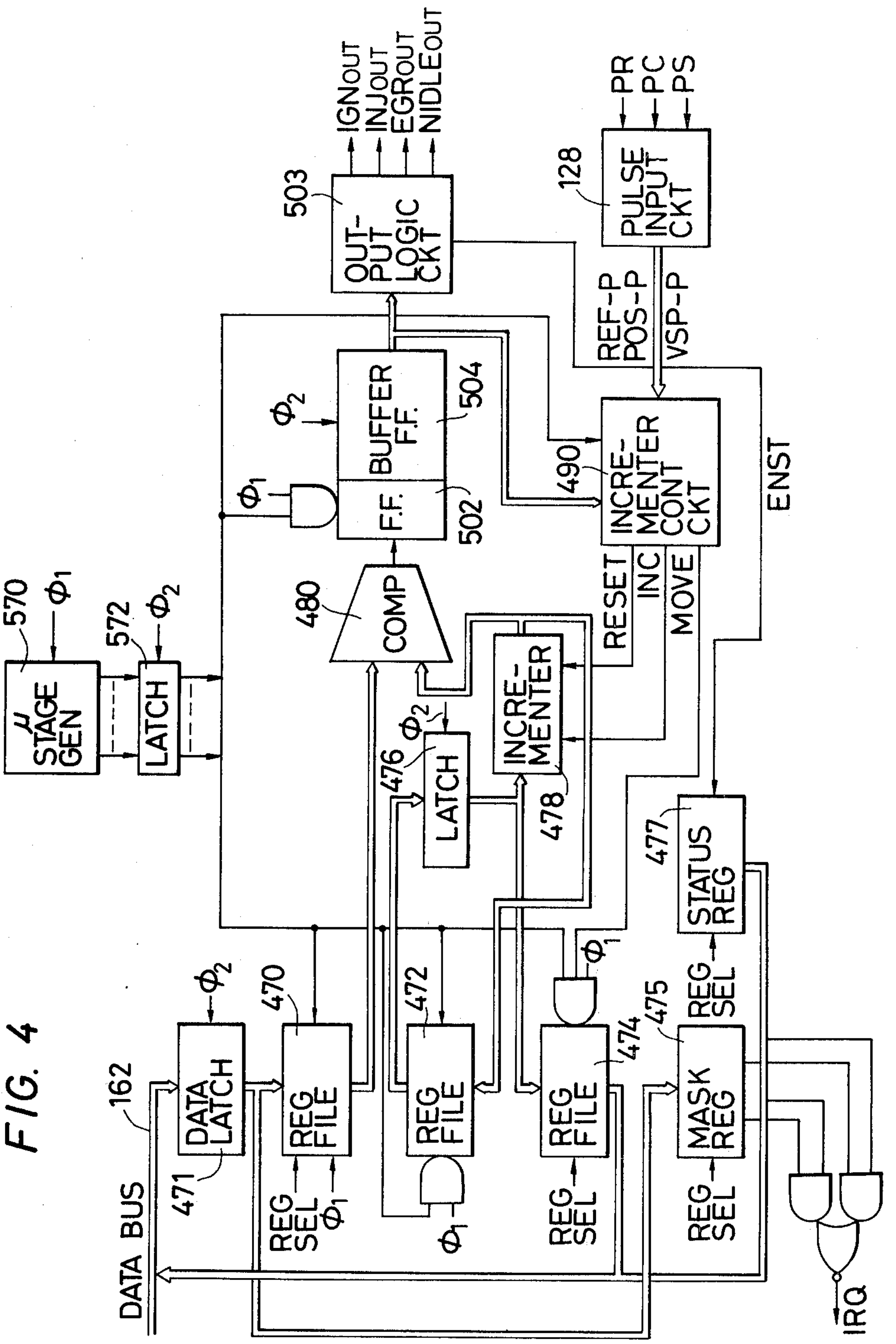
FIG. 4 is a block diagram showing a pulse output unit of the control unit shown in FIG. 3.

PULSE OUTPUT CIRCUIT (126):

FIG. 4 shows a specific configuration of the pulse output circuit 126. A first register file 470 includes a group of reference registers which hold the data processed by the CPU 114 or hold data indicative of predetermined values. The data is transmitted through the data bus 162 from the CPU 114. The assignment of the registers to hold the data is effected through the address bus 164, and the data is applied to the assigned registers and held therein.

A second register file 472 includes a group of registers which hold the signals indicative of the engine condition at an instant in time. The second register file 472, a latch circuit 476, and an incrementer 478 effect a so-called counter function.

A third register file 474 includes, for example, a register for holding the rotational speed of the engine and a register for holding the vehicular speed. These values are obtained in such a way that when certain conditions are fulfilled, the values of the second register file 472 are loaded. A relevant register is selected by a signal set through the address bus from the CPU 114 and the data held in the third register file 474 is sent to the CPU 114 through the data bus 162 from this register.

A comparator 480 receives reference data from a register selected from the first register file 470 and instantaneous data from a register selected from the second register file 472 and executes a comparative operation. The comparison result is delivered to and stored in a predetermined register selected from first register group 502 which function as comparison result holding circuits. Further, it is thereafter stored in a predetermined register selected from a second register group 504.

The read and write operations of the first, second, and third register files 470, 472, and 474 and the operations of the incrementer 478 and the comparator 480, and the operations of setting outputs into the first and second register group 502 and 504 are conducted during prescribed periods of time. Various processes are carried out in a time division manner in conformity with the stage sequence of a stage counter 570. At each state, predetermined registers among the first and second register files 470 and 472 and the first and second register groups and, if necessary, a predetermined register among the third register file 474 are selected. The incrementer 478 and the comparator 480 are used in common.

Description will be hereinafter given of each of the units making up pulse output unit 126.

Figure 7:
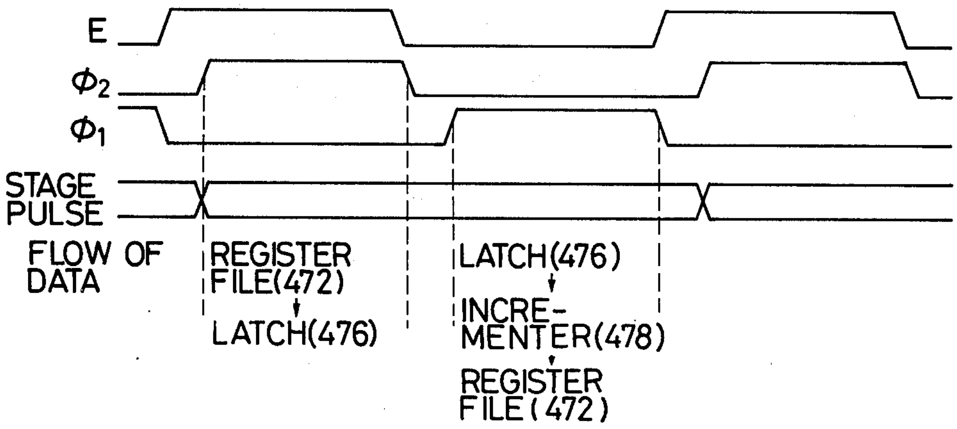
FIG. 7 shows waveforms of clock pulses and stage pulses.
Figure 9:
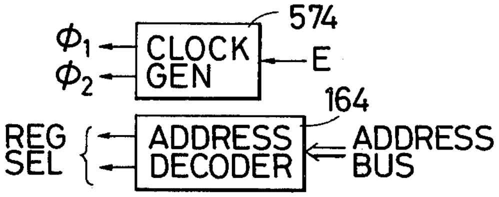
FIG. 9 is a block diagram showing a clock generator and an address decoder.
Figure 5:
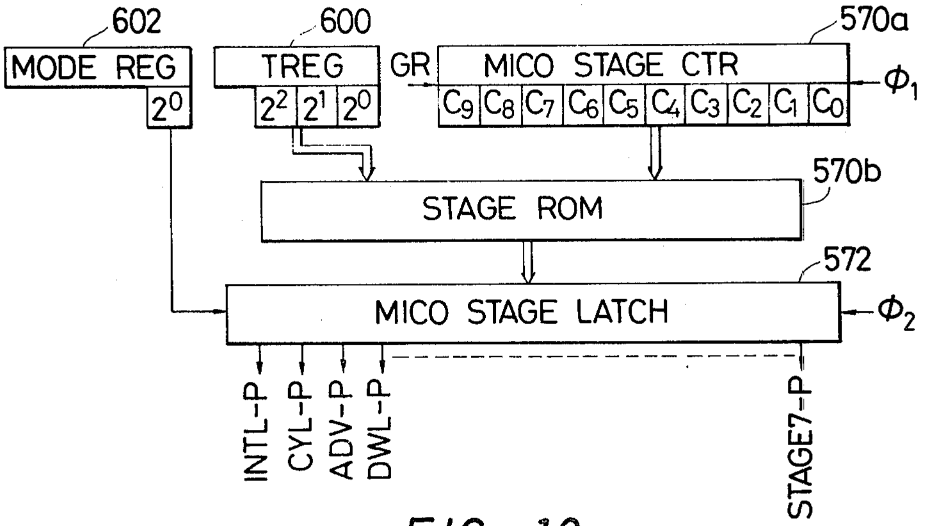
FIG. 5 shows a schematic diagram of a microstage pulse generator of the input/output unit.

STAGE PULSE GENERATOR (570):

In FIG. 5, the stage pulse generator 570 includes a clock pulse generator 574 for generating clock pulses $\phi_1$ and $\phi_2$ (FIG. 9), a microstage counter 570*a* (FIG. 5), a stage ROM 570*b* (read only memory), and a microstage latch circuit 572. When an enabling signal E from the CPU 114 is applied to a clock generator 574 as shown in FIG. 9, clock generator 574 produces clock pulses $\phi_1$ and $\phi_2$ as shown in FIG. 7. The pulses $\phi_1$ and $\phi_2$ are different in phase and do not overlap. As can be seen in FIG. 5, the clock pulse $\phi_1$ is applied to the microstage counter 570*a*. The microstage counter 570*a* is a ten bit counter, for example, and operates to count the clock pulses $\phi_1$ applied thereto. The counted value of the microstage counter 570*a* is applied together with an output from a register 600 (hereinafter referred to as T register) to the stage ROM 570*b*. ROM 570*b* is designed to produce stage pulses INTL-P~STAGE 7-P in accordance with the contents of the microstage counter 570*a* and T register 600.

FIG. 6 shows the relationship between various kinds of stage pulses and the contents of the counter 570*a* and T register 600. In this table of FIG. 6, symbol X denotes that any one of "1" and "0" can be taken for the purpose of producing stage pulses as far as the bit X is concerned. By way of example, when the lowest three bits C2, C1, and C0 of the microstage counter 570*a* are "0", "0", and "1", respectively, a stage pulse INTL-P is delivered. The set value of the T register 600 functions to determine intervals between stage pulses INJ-P, as can be seen in the table. A thus produced stage pulse is shifted to the microstage latch circuit 572 in synchronism with the clock pulse $\phi_2$. The stage pulse is delivered from the latch circuit 572 when the lowest bit $2^\circ$ of a mode register 602 is of the logical "1" when CPU 114 produces a G0 signal and is set with the logical "0" when CPU 114 outputs a Non-G0 signal. When the lowest bit $2^\circ$ of the mode register 602 is of the logical "0", the stage latch circuit 572 delivers no stage pulse except for the predetermined stage pulses STAGE 0-P and STAGE 7-P. In other words, only the stage pulses STAGE 0-P and STAGE 7-P are permitted to appear without regard to the set value of the mode register 602. The stage pulse is preferably designed to have a pulse width of 1 μsec. All the elementary operations such as ignition control, fuel injection control, and detection of the engine stop are performed with the aid of the stage pulse.

REGISTER FILE (470, 472):

In FIG. 4, data sent from the CPU 114 is applied through the data bus 162 to a latch circuit 471 and stored at the timing of the clock pulse $\phi_2$. Then the data is applied to a first register file 472 and is stored at the timing of the clock pulse $\phi_1$ in the register selected by the register select signal REG SEL supplied from the CPU 114. The register file 470 includes a plurality of registers 402, 404, . . . 428 as shown in FIG. 8A. These registers are designed to deliver the stored data by the application of the corresponding stage pulse thereto. By way of example, where the stage pulse CYL-P occurs at the output of the stage pulse latch circuit 572, the register 404 is selected to deliver its set data CYL REG as an output.

Figure 8B:
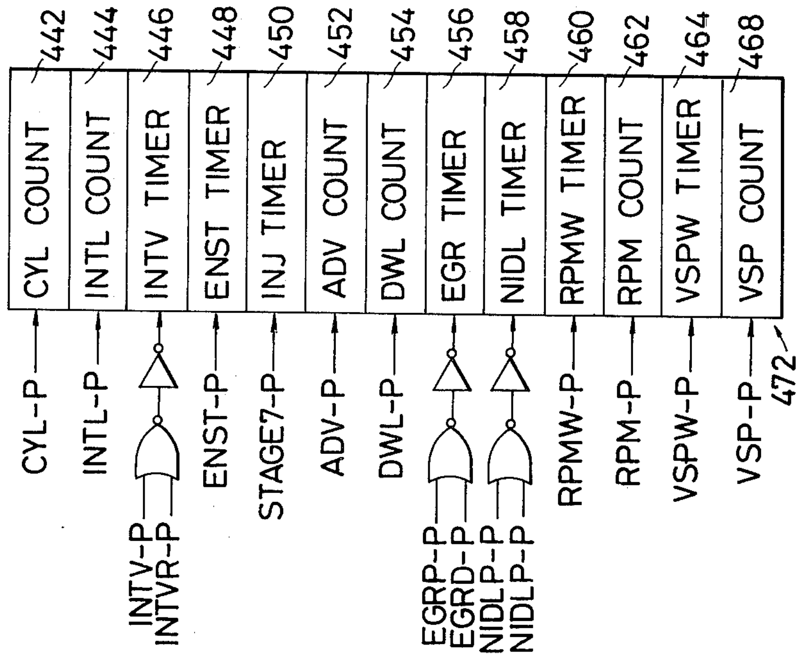
FIGS. 8A and 8B are diagrams showing first and second register files of the input/output units.
Figure 8A:
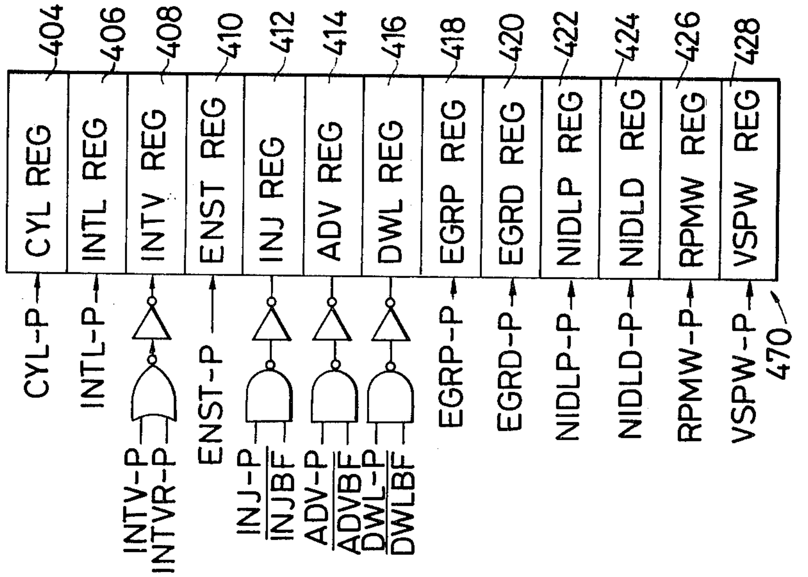

On the other hand, a second register file 472 includes a plurality of counters and timers 442, 444, . . . 468 as shown in FIG. 8B, each of which counts up pulses indicative of engine operating conditions as of the instant in time during engine operation. In the same manner as described in connection with the first register file 470, one of the counters (timers) is selected to deliver its count value when the corresponding stage pulse is applied thereto. Thus, the selected one of registers of the first register file 470 and the selected one of counters or timers of the second register file 472 deliver respective set data which is applied to a comparator 480 and are compared with each other. The comparator 480 produces an output when the count value of the counter or timer of the second register file 472 becomes equal to or greater than the set value of the register in the first register file 470. As will be appreciated from FIGS. 8A and 8B, when the stage pulse CYL-P appears for example, the contents of the register 404 and the counter 442 are compared with each other. Respective registers, counters, and timers are designed to have functions as explained below.

A register 404 stores data CYL REG indicative of a constant value determined in terms of the number of cylinders. On the other hand, a counter 442 counts up the reference pulses INTLD. By the comparison of the set value of the register 404 with the count value of the counter 442, a pulse is obtained every one revolution of crank angle. Data INTL REG stored in a register 406 are used to shift the reference pulse PR in phase by the amount of a fixed angle. A counter 444 counts up crank angle pulse PC produced after the reference pulse PR is detected by the angle sensor 98.

A register 408 holds data INTV REG representative of the period of time desired to be measured as the timer. On the other hand, a timer 446 counts up stage pulse INTV-P produced at intervals of a predetermined period of time, e.g. 1024 μsec. after the setting of data INTV REG into the register 408 has been completed. When the data INTAL REG are set, there is established e.g. the stage in which an interrupt signal can be delivered after lapse of the prescribed period of time. That is, the count value INTV TIMER of the timer 446 is compared with the set data INTV REG of the register 408 and when INTV TIMER becomes equal to or greater than INTV REG, the above-mentioned stage is established. A register 410 holds the data ENST REG representative of a predetermined period of time to be used for detecting the state in which the engine has stopped unexpectedly. A timer 448 counts up stage pulses ENST-P which occur every certain time, e.g., 1024 μsec. after the reference pulse PR has been detected from the angle sensor 98. The count value ENST TIMER of this timer 448 is returned to zero when the next reference pulse PR is detected. When the count value ENST TIMER becomes equal to or greater than the set data ENST REG, it is seen that the reference pulse PR does not appear for more than the predetermined period of time after the occurrence of the previous reference pulse. In other words, this means the engine has possibly stopped. A register 412 holds the data INJ REG representative of the valve opening time of the fuel injection valve 66 as shown in FIG. 3. A timer 450 counts up the stage pulse INJ-P which appears every predetermined period of time after a stage pulse CYL-P has been delivered from the microstage latch circuit 572 (FIG. 5). The period of time mentioned above is one selected from 8 μsec., 16 μsec., 32 μsec., 64 μsec., 128 μsec., and 256 μsec. This selection is performed by the data set into the T register 600 (FIG. 5). As is apparent from FIG. 6, when the three bits of the T register 600 are expressed as "0, 0, 0", the stage pulse INJ-P is delivered at intervals of 8 μsec. When the T register 600 stores three bits of "0, 0, 1", the microstage latch circuit 572 (FIG. 5) delivers the stage pulse INJ-P every 16 μsec. A register 414 is used to store the data ADV REG representative of the timing of ignition.

Figure 15:
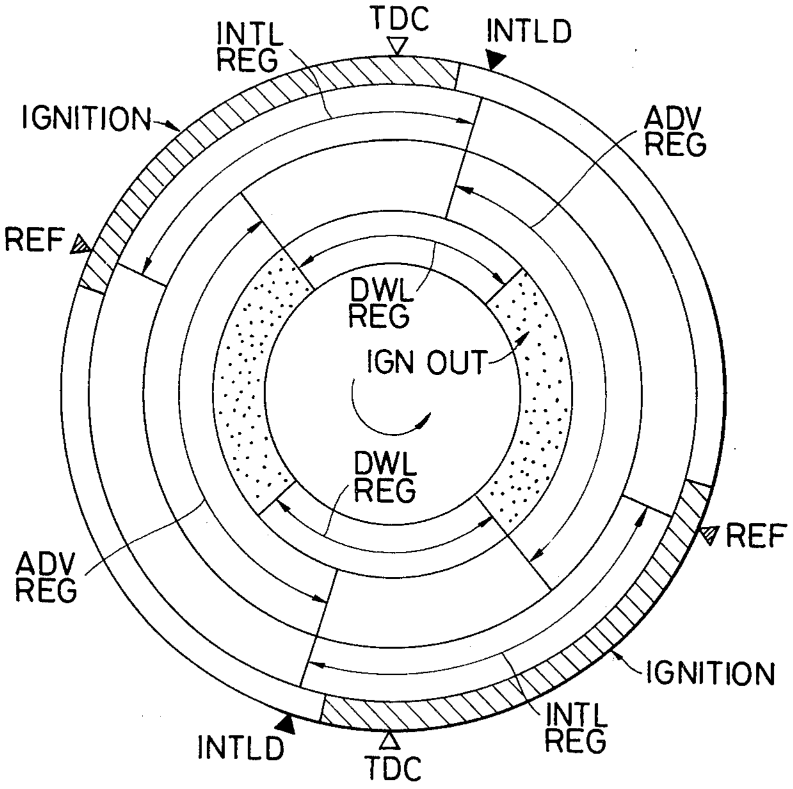
FIG. 15 is a diagram for explaining operation of the engine control system.

That is, the ignition may be performed at the predetermined crank angle indicated by the data ADV REG, after or before the occurrence of the reference pulse INTLD (FIG. 15). A counter 452 counts up the angle pulse PC after the stage pulse INTL-P has been delivered. The angle pulses PC are delivered from the angle sensor 98 at each time the engine is rotated by a predetermined amount of crank angles, e.g., 0.5°. A register 416 is provided to set the data DWL REG indicative of the angular period during which the primary coil current of the ignition coil is held in the cut-off state, as can be seen from FIG. 15. A counter 454 counts up pulses generated in synchronism with the crank angle pulses PC after the stage pulse INTL-P has been delivered. A register 418 is provided to store the data EGRP REG representative of the period of the pulsating current signal supplied to the EGR valve 28 (FIG. 3). A register 420 holds the data representative of the pulse width of the pulsating current supplied to the EGR valve 28. On the other hand, a timer 456 counts up pulses produced every lapse of a fixed time, e.g. 256 μsec. after the stage pulse EGRP-P has been delivered.

As mentioned heretobefore, the quantity of air passing through the bypass 46 of the throttle chamber 18 can be adjusted by means of the air regulator 48. A register 422 holds the data NIDLP REG representative of the period of the pulse applied to the regulator 48 and a register 424 stores the data NIDLD REG indicative of the pulse width. A timer 458 counts up the pulses produced every lapse of a fixed time, e.g., 256 μsec. after the stage pulse NIDLP-P has been delivered. A rotational speed of the engine is detected by counting the output pulses of the crank angle sensor 98 for a predetermined period of time. A register 426 is used to store the data RPMW REG representative of the period of time during which the crank angle pulses are counted. On the other hand, a register 426 is provided to hold the data VSPW REG representative of a fixed time to be used for detecting the vehicular speed. A timer 460 counts up the pulses generated every lapse of a fixed time after an output pulse has been delivered from a latch circuit 552. A counter 462 is used to count up the pulses produced in a predetermined relationship with the angle pulse PC, after the output pulse has been delivered from the latch circuit 552. Likewise after generation of an output from a latch circuit 556, a timer 464, counts up the pulses generated every lapse of a fixed time while a counter 468 counts up the pulses produced in response to the rotational speed of the wheels.

The data set into each of registers of the first register file 470 are supplied from CPU 114. The pulses to be counted by means of respective timers and counters of the second register file 472 are supplied from an incrementer 478.

Of those data to be set into the first register file 470, ones which are to be set into the registers 404, 406, 408, 410, 426 and 428 are constants. The other data which are to be set into the registers 412, 414, 416, 418, 420, 422 and 424 are experimentally obtained in known manners from sensed signals of various sensors.

INCREMENTER (478):

The incrementer 478 receives control signals INC and RESET from a controller 490 and is designed to produce and output being equal to the set value of the latch circuit 476 plus one when the control signal INC is applied thereto and to produce an output of zero when the control signal RESET is supplied thereto. Since the output of the incrementer 478 is applied to the second register file 472, the register of the second register file 472 functions as a timer or counter which counts up one by one in response to the control signal INC. The logic circuit of such an incrementer 478 is well known to those skilled in this art and therefore the details thereof will not be described in this specification. The output of the incrementer 478 is applied to the comparator 480 together with the output of the first register file 470. As described previously, the comparator 480 produces an output of the logical "1" when the output of the incrementer 478 becomes equal to or greater than the output of the first register file 470, otherwise it produces an output of the logical "0". The input to the incrementer 478 is set into a third register file 474 in synchronism with the clock pulse $\phi_1$ when a control signal MOVE is applied to the register file 474. The set data of the third register file 474 can be transferred through the data bus 162 to the CPU 114.

Precisely stated, the incrementer 478 has three functions as follows. The first is an increment function by which the input data to the incrementer 478 is added by one. The second is a non-increment function by which the input data to the incrementer 478 is passed therethrough without any operation of the addition. The third is a reset function by which the input to the incrementer 478 is changed to zero so that the data indicative of zero is delivered therefrom at all times without regard to its input value.

As mentioned previously, when one of the registers is selected from the second register file 472, the data stored in the selected register is applied through the latch circuit 476 to the incrementer 478 whose output is fed back to the selected register so that the contents of the selected register are refreshed. As a result, where the incrementer 478 offers the increment function by which the input thereof is increased by one, the selected register of the second register file functions as a counter or timer.

In the closed loop including the register file 472, latch circuit 476 and incrementer 478, if such an operating condition occurs that the output of the incrementer 478 begins to be set into the second register file 472 whilethe contents of the register file 472 are being delivered, an error of the counting operation will be caused at the register file 472. To eliminate such an error, the latch circuit 476 is provided to separate in time the data flow from the file register 472 to the incrementer 478 and the data flow from the incrementer 478 to the file register 472.

The latch circuit 476 is applied with the clock pulse $\phi_2$ and is permitted to receive data from the register file 472 during the period of time that the clock pulse $\phi_2$ appears, as shown in FIG. 7. On the other hand, the register file 472 is applied with the clock pulse $\phi_1$ and is permitted to receive data from the latch circuit 476 through the incrementer 478 during the period of time that the clock pulse $\phi_1$ appears. As a result, there will be no interference between data flows delivered from and applied to the second register file 472.

Figure 10:
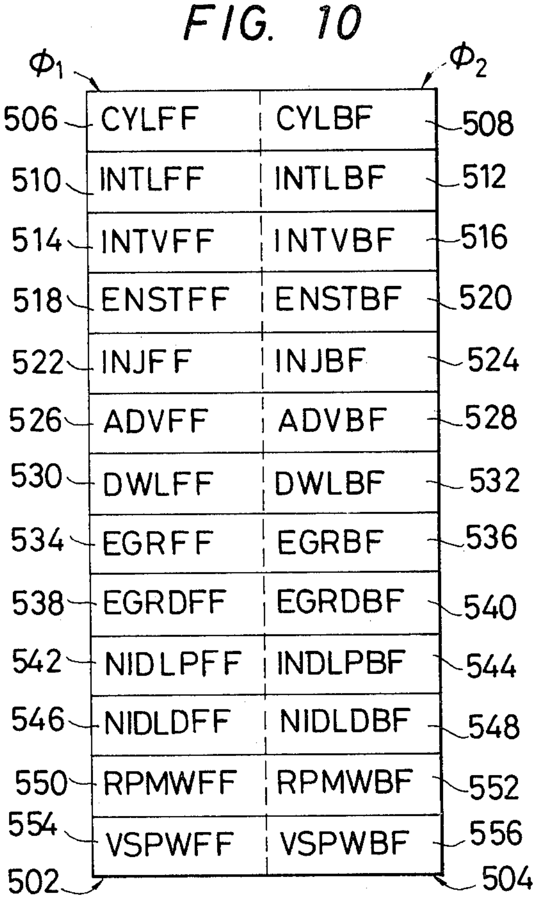
FIG. 10 shows a diagram of an output register group of the input/output unit.

COMPARATOR (480):

A GROUP OF REGISTERS (502. 504):

OUTPUT LOGIC CIRCUIT (503):

Like the incrementer 478, the comparator 480 does not operate in synchronism with the clock pulses $\phi_1$ and $\phi_2$. Inputs of the comparator 480 are the data delivered from the selected register of the register file 470 and the data delivered from the selected counter or timer through the latch circuit 476 and the incrementer 478. The output signal of the comparator 480 is applied to a first register group 502 including a plurality of latch circuits and is set to the selected latch circuit in synchronism with the clock pulse $\phi_1$. The data thus written into the first register group 502 is then shifted to a second register group 504 in synchronism with the clock pulse $\phi_2$. An output logic circuit 503 receives the data set in the second register group 504 to produce output signals for driving the fuel injector, ignition coil, exhaust gas recirculating device and the others. This output circuit 503 includes a logic circuit shown at the reference numeral 710 in FIG. 18, the operation of which will be described later. The first and second register groups include a plurality of latch circuits 506, 510, . . . 554 and 508, 512, . . . 556, respectively, as shown in FIG. 10.

The data CYL REG of the register 404 (FIG. 8A) are compared with the count value CYL COUNT of the counter 442 by means of the comparator 480. The comparator 480 delivers an output of logical "1" when CYL COUNT becomes equal to or greater than CYL REG and the resulting output is then set into a latch circuit 506 of the output register group 502. The selection of this latch circuit 506 is performed by way of the stage pulse CYL-P. The set data into the latch circuit 506 is applied to the latch circuit 508 at the timing of clock pulse $\phi_2$. The latch circuits of the first output register group 502 are respectively connected to the corresponding latch circuits of the second output register group 504. In a similar way, a signal logical "1" is set into the latch circuit 510 when the condition INTL REG≦INTL COUNT is detected. The content of the latch circuit 510 is shifted into the latch circuit 512 at the timing of clock pulse $\phi_2$.

Likewise, upon the conditions that

| | |
|---|---|
| INTV REG ≦ | INVT TIMER, |
| ENST REG ≦ | ENST TIMER, |
| INJ REG ≦ | INJ TIMER, |
| ADV REG ≦ | ADV COUNTER, |
| DWL REG ≦ | DWL COUNTER, |
| EGRP REG ≦ | EGR TIMER, |
| EGRD REG ≦ | EGR TIMER, |
| NIDLP REG ≦ | NIDL TIMER, |
| NIDLD REG ≦ | NIDL TIMER, |
| RPMW REG ≦ | RPMW TIMER, and |
| VSPW REG ≦ | VSPW TIMER |

a signal of logical "1" is respectively set in the latch circuits 514, 518, 522, 526, 530, 534, 538, 542, 546, 550 and 554. Since each of latch circuits of the output register groups 502 and 504 stores information of either "1" or "0", it may be 1 bit register.

Figure 17:
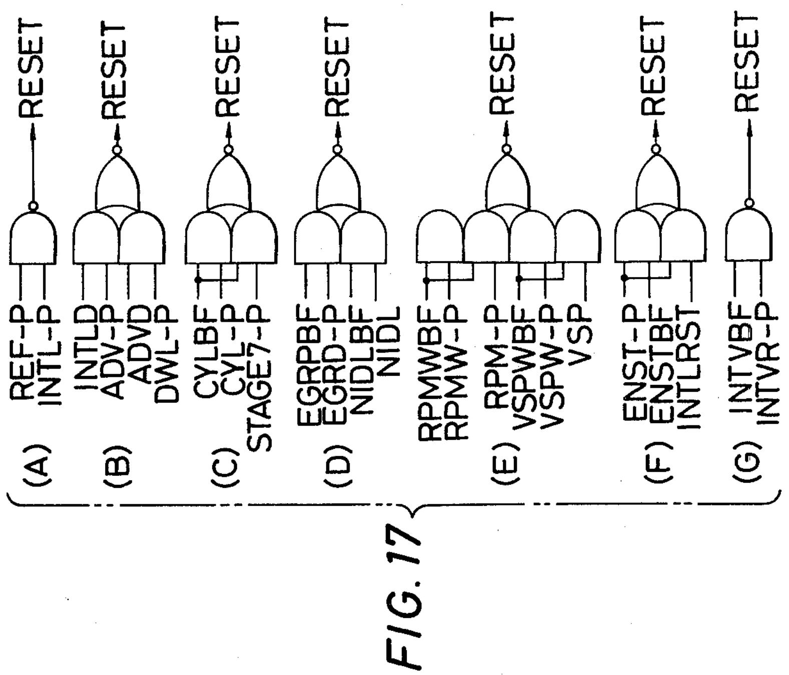
FIG. 17 is a schematic diagram showing a logic circuit for producing a reset signal.
Figure 16:
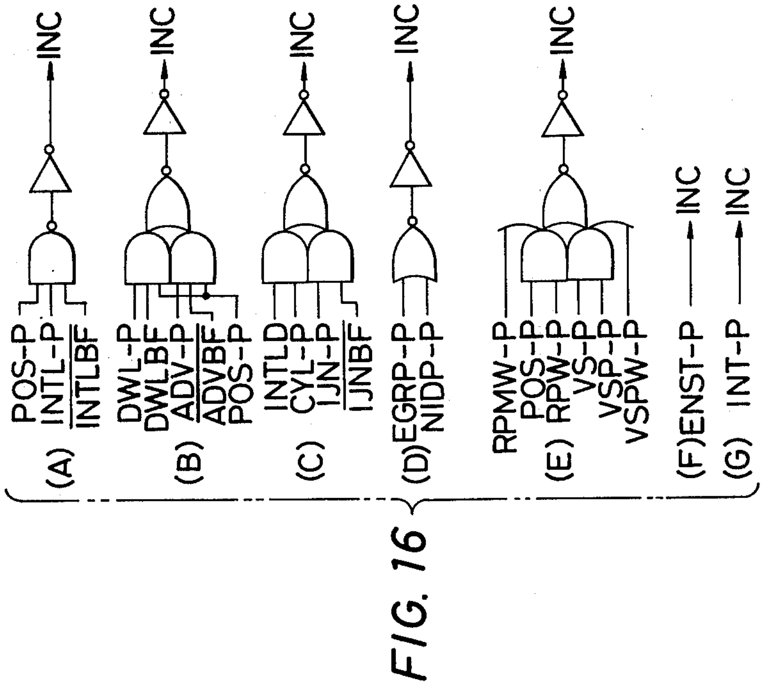
FIG. 16 is a schematic diagram showing a logic circuit for producing an increment control signal.

INCREMENTER CONTROL CIRCUIT (490):

The incrementer control circuit 490 includes logic circuits shown in FIGS. 16 and 17 and produces control signals INC, RESET, MOVE for the control the incrementer 478. The operation and details of the incrementer control circuit 490 will be described later.

STATUS REGISTER (477):

MASK REGISTER (475):

The status register 477 is provided to indicate whether or not there are interrupt requests due to the engine stop ENST, the termination of A-D converter operation and the others. The mask register 475 is adapted to receive data sent through the data bus from the CPU 114. Depending upon the data received, the mask register 475 functions to control the inhibition or admission of sending interrupt request signal IRQ to the CPU 114 when such interrupt request has occurred.

INPUT SIGNAL SYNCHRONIZER CIRCUIT (128):

This circuit 128 receives sensed pulses indicative of, for example, the rotational speed of the engine and a vehicular speed and produces an output pulse synchronized with the clock pulse $\phi_1$ or $\phi_2$. The pulses sensed and applied to the synchronizer circuit 128 are a reference signal PR which is generated every revolution of the engine, an angle signal PC produced each time the engine rotates a predetermined angle and a pulse PS indicative of the vehicle running speed. The intervals of these pulses change greatly depending on, for example, the vehicular speed and are not synchronized with the clock pulses $\phi_1$ and $\phi_2$. In order to use these pulses PR, PC, and PS for the control of the incrementer 478 the sensed pulses are necessary to be synchronized with the stage pulse. Further, the angle signal PC and the vehicular speed signal PS are to be synchronized at both the rising portions and falling portions with the stage pulse for the improvement of detection accuracy while the reference signal PR may be synchronized at its rising with the stage pulse.

Figure 11:
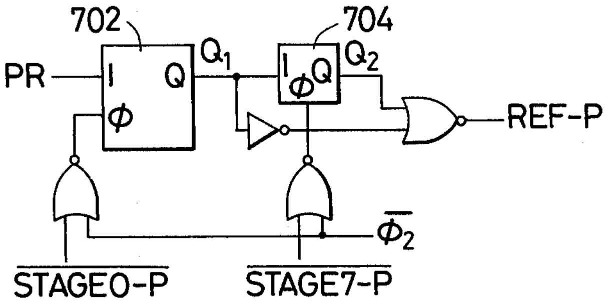
FIG. 11 is a schematic diagram of a logic circuit for producing a reference signal.
Figure 12:
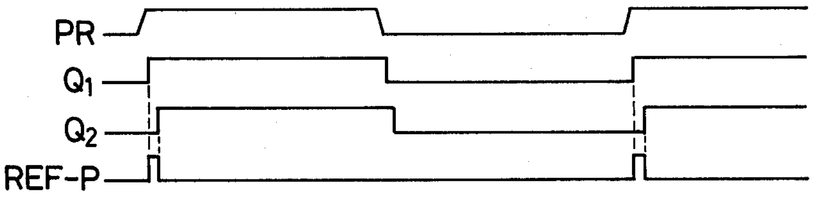
FIG. 12 shows waveforms of signals appearing at respective points of the logic circuit shown in FIG. 11.

In FIG. 11, showing a logic diagram of a synchronizer circuit for the reference signal PR, the sensed signal PR is applied to a terminal I, and the inverted clock pulse $\phi_2$ as well as the inverted stage pulse STAGE 0-P are applied through NOR logic circuit to a terminal $\phi$ of a latch circuit 702. The latch circuit 702 produces, at a terminal Q, an output pulse shown at $Q_1$ in FIG. 12. Another latch circuit 704 receives at its terminal I the pulse $Q_1$ and at its terminal $\phi$ the inverted clock pulse $\phi_2$ together with the inverted stage pulse STAGE 7-P through a NOR logic circuit. As a result, the latch circuit 704 produces an output shown at $Q_2$ in FIG. 12. A synchronized reference pulse REF-P is produced from the output $Q_2$ and the inverted output $Q_1$ as shown at REF-P in FIG. 12.

Figure 13:
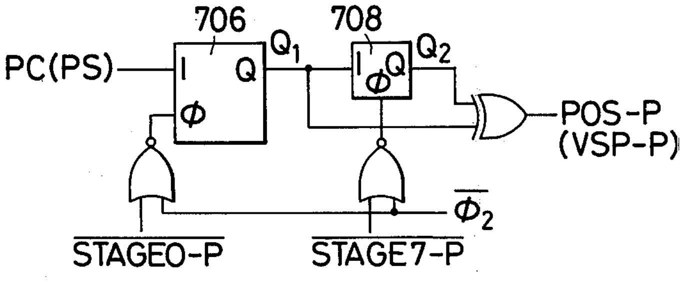
FIG. 13 is a schematic diagram of a logic circuit for producing an angle signal.
Figure 14:
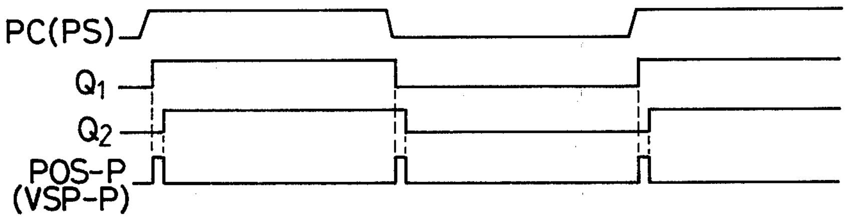
FIG. 14 shows waveforms of signals appearing at respective points of the logic circuit shown in FIG. 13.

In FIG. 13, showing a synchronizer circuit for the angle signal PC and the vehicular speed signal PS, the sensed signal PC (or PS) shown in FIG. 14 is applied to a terminal I while the inverted clock pulse $\phi_2$ and the inverted stage pulse STAGE 0-P are applied through NOR logic circuit to a terminal $\phi$ of a latch circuit 706. Obtained from a terminal Q of the latch circuit 706 is signal $Q_1$ shown in FIG. 14, which is applied to a terminal I of a latch circuit 708. The output $Q_1$ and $Q_2$ of the latch circuits 706 and 708 are applied to an exclusive OR logic circuit to generate a synchronized signal POS-P (or VSP-P).

OPERATION:

(1) Producing a Reference Pulse INTLD

Figure 18:
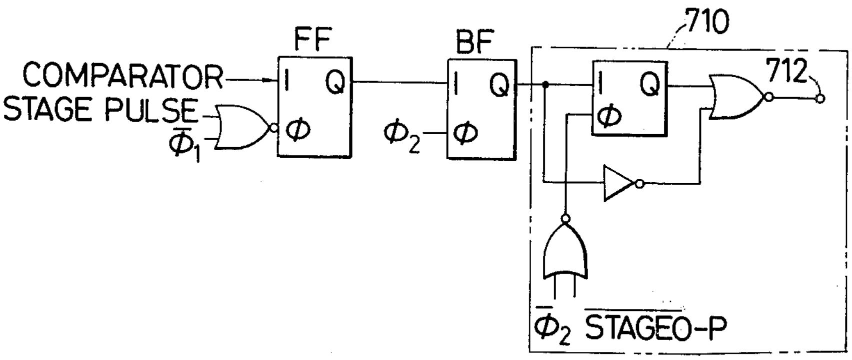
FIG. 18 shows a diagram of an output logic circuit.
Figure 19:
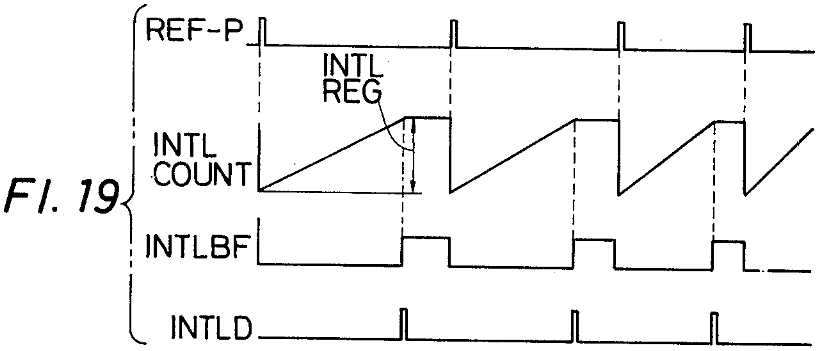
FIGS. 19, 20, 21, 25, 26 and 27 show waveforms for explanation of the operation of the engine control apparatus.

For the controls of ignition timing, fuel injection and the detection of the engine stop, it is necessary to produce the reference pulse INTLD which is delayed by the angle corresponding to the value INTL set in the register 406 from the pulse PR obtained by means of a crank angle sensor, as shown in FIG. 15. This pulse INTLD serves to set the reference point for the controls such as the ignition timing. The reference point is set at the position spaced by a predetermined angle from the top dead center of the engine, so that the ignition can take place at the predetermined timing irrespective of the mounting position of the crank angle sensor. When the stage pulse generator 570 produces the stage pulse INTL-P, the register 406 of the first register file 470 and the counter 444 of the second register file 472 are selected for the operation of comparison, as seen from FIGS. 8A and 8B. At the same time, the increment or controller 490 produces the increment control signal INC by means of the logic circuit shown in FIG. 16(A) and the reset signal RESET by means of the logic circuit shown in FIG. 17(A). Both the increment control signal INC and the reset signal RESET are applied to the incrementer 478. The counter 444 counts up the stage pulse POS-P so that the resulted count value increases gradually as shown at INTL COUNT in FIG. 19. When the count value INTL COUNT of the counter 444 becomes equal to or greater than the set value INTL REG of the register 406, that is, INTL REG≦INTL COUNT, the comparator 480 produces an output which is applied to the latch circuit 510 of the first register group 502, and then to the latch circuit 512 of the second register group 504 as shown in FIG. 10. The logic circuit shown at a reference number 710 in FIG. 18 is connected to the output of the latch circuit 512 so that the reference pulse INTLD shown in FIG. 19 can be obtained at an output terminal 712 of the logic circuit 710. It is noted in FIG. 19 that the pulse INTLBF used for producing INTLD pulse is an output from the latch circuit 512 of FIG. 10.

As can be seen from FIG. 16(A), not only the stage pulses POS-P, INTL-P, but also the inverted output INTLBF of the latch circuit 512 are utilized for producing the increment control signal INC so that the counter 444 will terminate its counting operation when the condition of (INTL COUNT)≧(INTL REG) is detected by the comparator 480. Reasons for the necessity for the termination of the counting operation are as follows. In the case of a four cylinder engine, the reference pulse REF-P is produced once every 180° of the crank shaft movement. If the crank angle sensor is designed to generate pulses POS-P every 0.5° of angular movement of the crank shaft, the number of pulses POS-P becomes more than 360 between two adjacent reference pulses REF-P. Since the counter 444 is usually designed to have eight bits, the above-mentioned number of reference pulse REF-P is great enough to cause overflow in the counter 444, thereby producing another pulse INTLD at the undesired timing. The use of the output pulse INTLBF for producing the increment control signal serves to prevent the producing of such undesired reference pulse.

(2) Ignition Control

In the operation of the ignition control, a control signal IGN out is produced which flows through the ignition coil. For this control, data ADV indicative of the ignition timing and data DWL indicative of the nonconductive period of time of the ignition coil are supplied from the CPU 114 and set into the registers 414 and 416 respectively. FIG. 15 shows the relationship between the set value ADV REG of the register 414 and the set value DWL REG of the register 416. The set value ADV REG serves to define a spark advance indicating the position of the crank shaft at which an ignition spark is to occur after (or before) the piston reaches its top dead center position, while the set value DWL REG indicates the number of crank angles during which the ignition coil is rendered non-conductive.

Figure 20:
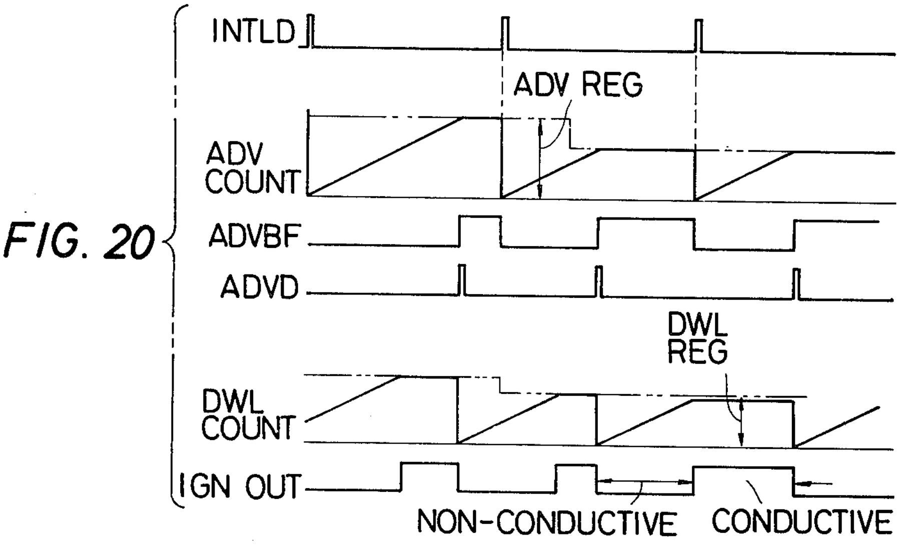

When the stage pulse ADV-P is delivered from the stage pulse generator 570, and applied to the first and second register files 470, 472, the register 414 and the counter 452 are selected for operation, as shown in FIGS. 8A and 8B. At the same time, the stage pulse ADV-P is applied to the incrementer controller 490 in which an increment control signal INC is produced by a logic circuit shown in FIG. 16(B) and a reset signal RESET is produced by a logic circuit shown in FIG. 17(B). By the application of the increment signal INC to the incrementer 478, the incrementer 478 functions to add "1" with the value set in the latch circuit 478 and delivers the resultant value to the second register file 472, so that the counter 452 of the second register file 472 counts up the synchronized angle pulses POS-P. When the count value ADV COUNT of the counter 452 is equal to or greater than the value ADV REG in the register 414, the comparator 480 produces an output which is applied to a latch circuit 526 of the first register group 502 shown in FIG. 10. An output of the latch circuit 526 is applied to another latch circuit 528 and then to an output logic circuit 710 shown in FIG. 18. The logic circuit 710 functions to produce an output pulse ADVD shown in FIG. 20 from the output ADVBF of the latch circuit 528. This output pulse ADVD is used for producing a reset signal in the DWL-P stage (FIG. 17(B)). When the stage pulse DWL-P is delivered from the stage pulse generator 570, the register 416 of the first register file 470 and the counter 454 are selected for operation as can be seen from FIGS. 8A and 8B. In the incrementer controller 490, the increment control signal INC and the reset signal RESET are produced by logic circuits shown in FIGS. 16(B) and 17(B), respectively. As a result, the counter 454 increases its count value in accordance with the pulse POS-P and remains at a constant value upon reaching the set value DWL REG of the register 416, and is then reset by the aforementioned pulse ADVD as shown in FIG. 20. The comparator produces an output signal which is rendered into its on-state when the count value DWL COUNT is equal to the set value DWL REG. As a result, the latch circuit 532 delivers an output pulse shown at IGN out in FIG. 20, which is supplied to the ignition coil.

(3) Fuel Injection Control

In operation of the fuel injection control, the timing of the fuel injection relative to the ignition timing and the others is shown in FIG. 2. As will be appreciated from FIG. 2, the fuel injection takes place once every revolution of the engine at the same time for all the cylinders.

Figure 21:
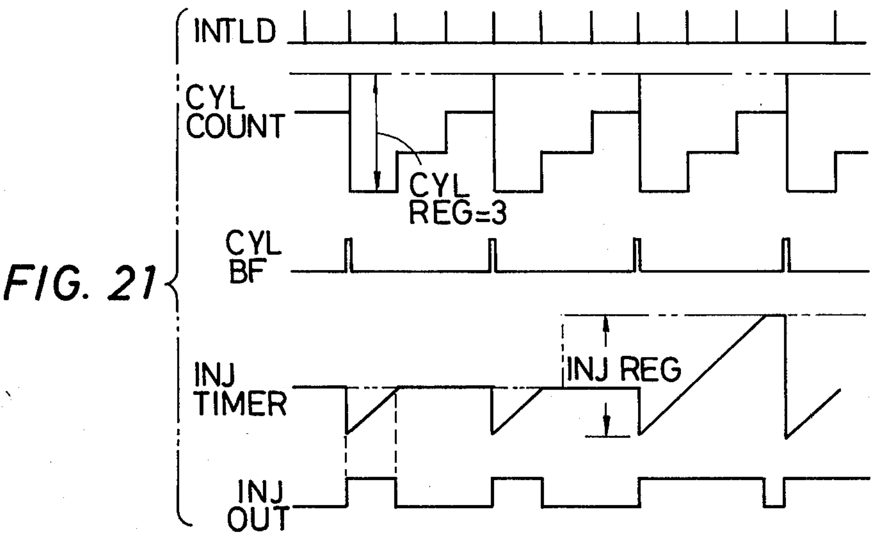

When the stage pulse CYL-P is delivered from the stage pulse generator 570, it serves to select the register 404 of the first register file 470 and the counter 442 of the second register file 472. The register 404 is preliminarily set with a constant value CYL REG which is, for example, equal to 2 in the case of a four cylinder engine, and 3 in the case of a six cylinder engine. By the application of the stage pulse CYL-P to the increment control circuit 490, the incremental control circuit 490 produces an increment control signal INC and a reset signal RESET by means of logic circuits shown in FIGS. 16(C) and 17(C), respectively. As a result, the count value CYL COUNT of the counter 442 varies in accordance with the pulse INTLD as shown in FIG. 21 and when the count value CYL COUNT of the counter 442 reaches a value equal to the set constant number CYL REG, the latch circuit 508 produces an output shown at CYLBF in FIG. 21.

Following the above-mentioned stage, when the next stage pulse INJ-P is produced, the register 412 of the first register file 470 and the timer 450 of the second register file 472 are selected for operation of the comparison. At the same time, the incrementer 490 is given an increment control signal INC and a reset signal RESET produced by logic circuits shown in FIGS. 16(C) and 17(C), respectively. With the aid of the incrementer 478, the timer 450 increases its value until the value becomes equal to the set data INJ REG of the register 412 and is reset by the aforementioned pulse CYLBF. The comparator 480 delivers an output signal during the condition of INJ TIMER≧INJ REG being met. Since the output logic circuit 710 shown in FIG. 18 is connected with the latch circuit 524 to which the comparator output is applied through the latch circuit 522, an injection control signal shown at INJ out can be obtained at the output terminal 712 of the output logic circuit 710. The reason why the timer 450 is designed to terminate its counting operation when the count value INJ COUNT becomes equal to the set value INJ REG of the register 412 is to prevent the timer 450 from overflowing in its count value just like the case of the ignition control. The presence of the injection control signal INJ out is set at the bit of 20 in the status register 477 in synchronism with the clock pulse $\phi_1$ so that the CPU 114 may be informed of the condition of the injection control signal INJ out, if necessary.

The description will now be made of the correction for the fuel injection control. The switching of the control mode from the normal fuel injection to the corrective fuel injection will be desired under the following conditions.

A first condition is when a first switch (not shown) of the throttle position detector 24 operates from its on state to its off state. This switch turns on in the case where the throttle valve 20 is at a fully closed position, otherwise the switch is off. When the switch is brought into its off state, the quantity of air sucked into the internal combustion chamber will change abruptly thereby causing a shortage of the amount of injected fuel.

A second condition is when the quantity of sucked air QA is detected by means of the air flow meter 14 to change with time over a predetermined value.

A third condition is when a second switch (not shown) of the throttle position detector operates from its off state to its on state. This second switch turns on when the throttle valve 20 is brought into its fully open position, and otherwise it remains off. Accordingly, turning on the second switch is caused only when an acceleration pedal is fully stepped down so that an increased amount of fuel is required to be injected into the internal combustion engine.

FIGS. 22(A), (B) and (C) show the relationship of timings between the output signal INJ out during normal fuel injection and pulses INTLD, CYLBF (FIG. 21). Symbols denoted at $C_1$, $C_2$, $C_3$ and $C_4$ respectively indicate the timings at which the correction for the fuel injection is instructed for acceleration of the automotive vehicle. $C_1$ indicates that the instruction for the corrective fuel injection is delivered during the normal fuel injection being carried out, while $C_2$ indicates that the instruction for the corrective fuel injection is delivered at the timing between a first reference pulse INTLD1 and a second reference INTLD2 after the completion of the normal fuel injection. In case of $C_1$ or $C_2$, an embodiment of the present invention is designed to produce an output signal INJ' out for a corrective fuel injection in synchronism with the second reference pulse INTLD2 as shown at a in FIG. 22(D). On the other hand, in a case where the instruction for the corrective fuel injection is delivered at the timing $C_3$ between the second reference pulse INTLD2 and the third reference pulse INTLD3, the output signal INJ' out is generated at the same timing as $C_3$, as shown at b in FIG. 22(E). Further, in a case where the instruction for corrective fuel injection is caused at the timing $C_4$ between the third reference pulse INTLD3 and the adjacent first reference pulse INTLD1, the output signal INJ' out is produced at the same timing as $C_4$, as shown at c in FIG. 22(F). It is noted that after the occurrence of the output pulse INJ' out for the corrective fuel injection, the normal fuel injection will be carried out each time that three reference pulses INTLD are delivered. As a result, the output pulse INJ' out for the normal fuel injection after the corrective fuel injection will be delivered at timings different from those shown in FIG. 22(C). This causes, however, no problem under such conditions that the fuel is injected into the internal combustion engine with every one revolution of the crank shaft.

Figure 23:
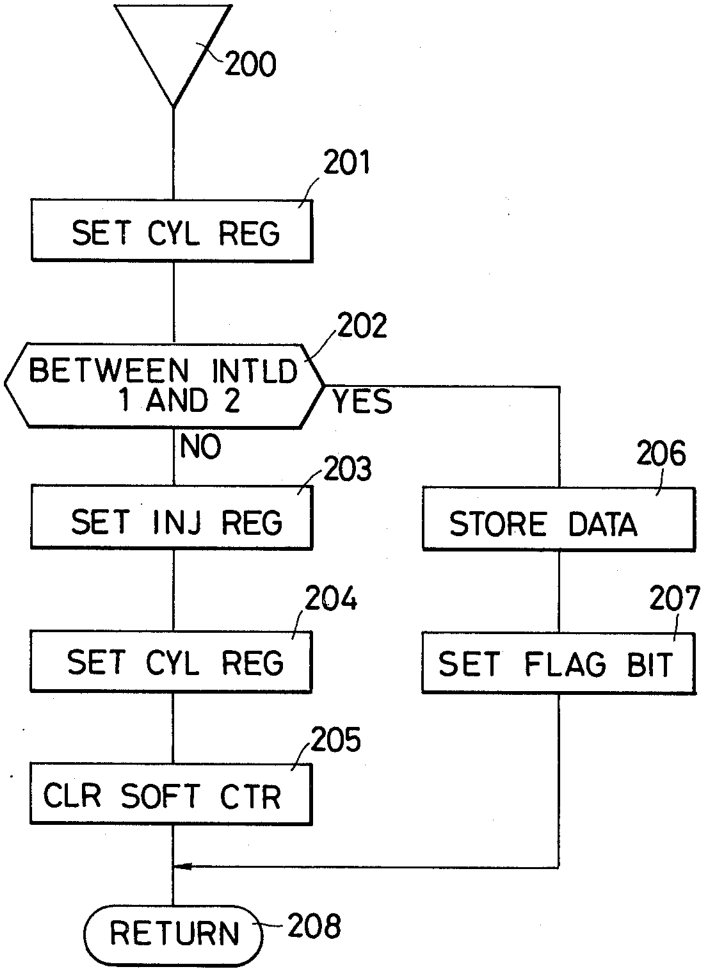
FIGS. 23 and 24 show flow charts for explanation of the operation of the corrective fuel injection.

FIG. 23 shows a flow chart for the explanation of the operation of the corrective fuel injection.

It is now assumed that any one of the three conditions for an acceleration mentioned before is met and therefore a corrective fuel injection is required to take place. At a step 201 of the flow chart in FIG. 23, the number of "1" is set into the CYL register 404 of the first register file 470. As a result, when the count value of the CYL counter 442 of the second register file 472 becomes equal to "1", an output is delivered from the latch circuit 508 of the output register group 504. It will be understood that when the instruction or interruption for corrective fuel injection occurs at the timing $C_1$ or $C_2$, an output CYLBF (FIG. 21) is delivered in synchronism with the reference pulse INTLD produced subsequent to $C_1$ or $C_2$.

On the other hand, if the instruction or interruption for corrective fuel injection occurs at the timing $C_3$ or $C_4$, the count value of the counter 442 is already equal to "1" as can be seen from FIG. 21. Accordingly, the latch circuit 508 delivers the output signal CYLBF at substantially the same timing that the number of "1" is set into the CYL register 404.

At a step 202 in FIG. 23, it is judged whether the timing of the instruction for the corrective fuel injection is between the first reference pulse INTLD1 and the second reference pulse INTLD2. According to an embodiment of the present invention, the reference pulses INTLD are counted up by means of software (which is hereinafter referred to as a softcounter) and the resultant value is stored in a predetermined area of RAM 116. Therefore, the judgment of the step 202 can be effected with reference to the count value of the softcounter. If the content of the softcounter remains zero when the instruction for the corrective fuel injection occurs, it is judged that the timing of the instruction is between the first reference pulse INTLD1 and the second reference pulse INTLD2. In this case, the data to be set into the INJ register 412 for determining the duration of the corrective fuel injection is temporarily stored in RAM 116, as shown at a step 206. At a step 207, a signal corresponding to a logical "1" is set into a flag bit provided in a predetermined area of RAM 116 so that the processing of the corrective fuel injection can be carried out when an INTL interruption signal is delivered, as explained later. This flag bit is provided to indicate that the normal fuel injection be performed if the flag bit is set to "0" while the corrective fuel injection be performed if the flag bit is set "1". By the completion of the processing of the step 207, it is ready to proceed with another task.

Figure 22:
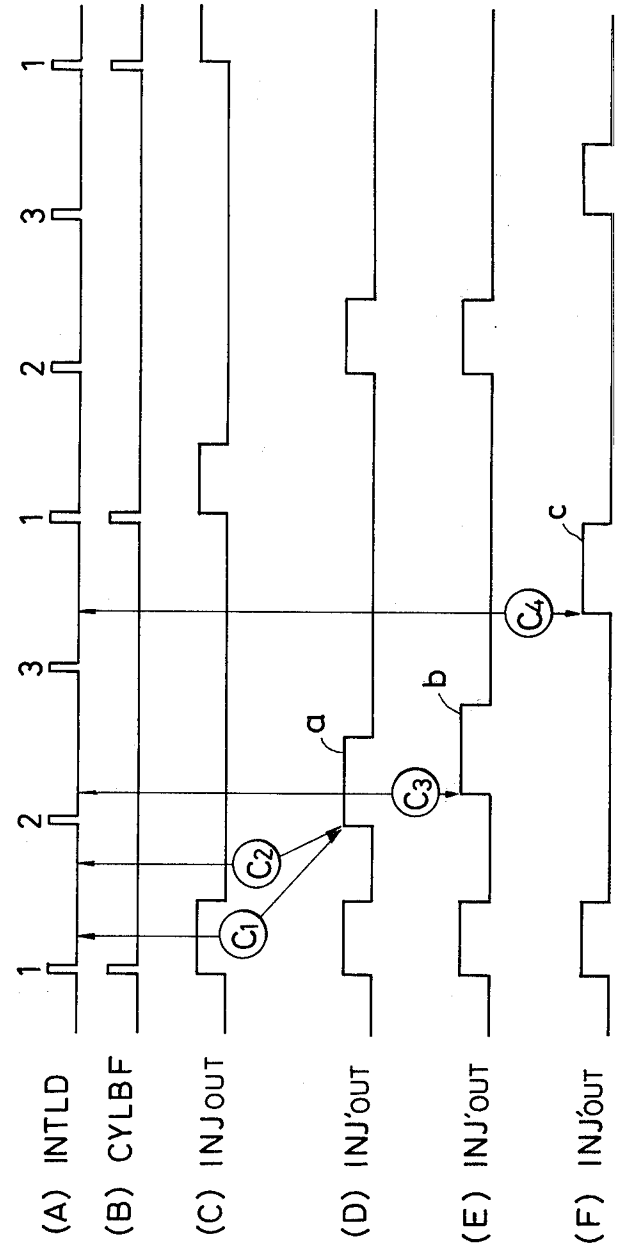
FIG. 22 shows timings of corrective fuel injections according to the embodiments of the present invention.

On the other hand, if the result of the judgment at the step 202 is NO, e.g. the instruction for the corrective fuel injection occurs at the timings such as $C_3$ or $C_4$ the processing of a step 203 is carried out. In this case, since the signal CYLBF is delivered at once, the data representative of the duration for the corrective fuel injection are set into the INJ register 412 with no delay. Simultaneously, the T register 600 (FIG. 5) is set with the data indicative of the period of the clock pulse. By this step 203, the output pulse INJ' out for the corrective fuel injection is delivered as shown in FIG. 22. At a step 204, the CYL register 404 is again set with the number of 3 so that the control mode can be returned for the normal fuel injection. By this setting of the number of 3, the output pulse INJ' out will be delivered each time every three reference pulses INTLD after the occurrence of the pulse INJ' out. Since the setting of the number of 3 into the CYL register 404 is performed after the signal CYLBF is delivered, it will give no influence on the corrective fuel injection. Further, at a step 205, the softcounter is reset so that it can be ready for counting up the reference pulse INTLD produced after the occurrence of the corrective fuel injection pulse INJ' out.

Figure 24:
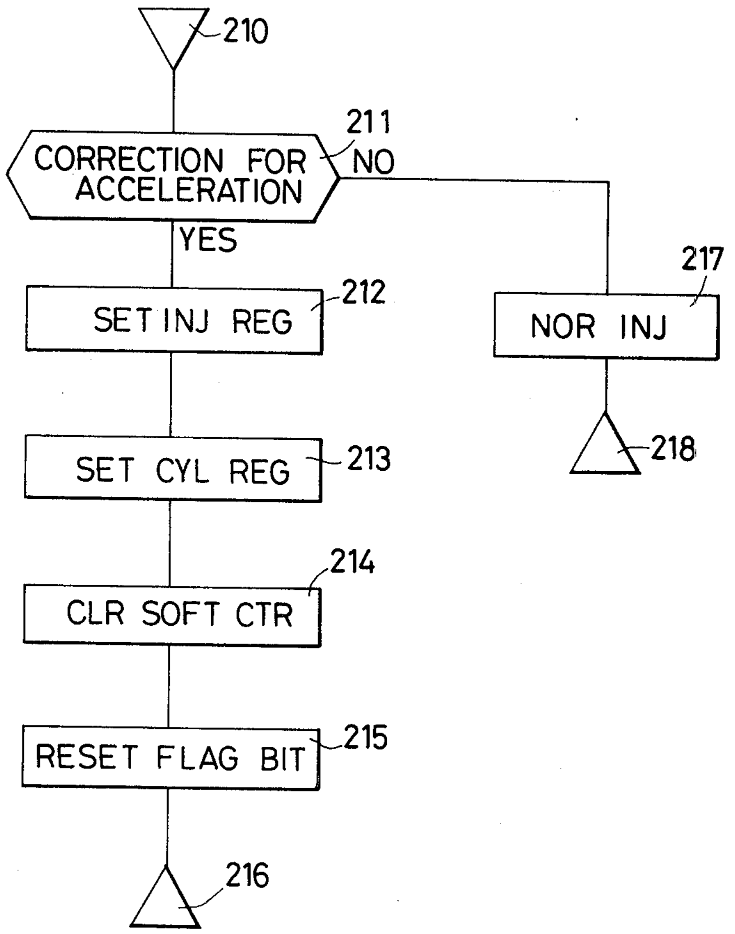

The description will be made of the processing in the case where the instruction for the corrective fuel injection occurs at the timing indicated at $C_1$ or $C_2$, with reference to FIG. 24. As mentioned before, if the number of 1 is set in the CYL register 404, the latch circuit 508 will deliver the output signal CYLBF (FIG. 21) at the time the subsequent reference pulse INTLD is produced. At a step 210, the interruption for the following processing is made on the basis of the reference signal INTLD. This interruption is referred to as INTL interruption. At a step 211, the judgment is made as to whether the processing to be performed is for the corrective fuel injection. This judgment depends upon the content of the flag bit provided in an area of RAM 116. If the flag bit is a logical "1", then the processing for the corrective fuel injection is to be performed. At a step 212, the data which was stored at the step 206 (FIG. 23) is read out from RAM 116 and stored in the INJ register 412. At the same time, the T register 600 (FIG. 5) stores the data representative of the period of the clock pulse. Accordingly, the output pulse INJ' out for the corrective fuel injection is produced in synchronism with the second reference pulse INTLD2, as shown in FIG. 22(D). As a result, the correction for the quantity of injected fuel is carried out in accordance with the set data of the register 412.

In order to return to the normal fuel injection mode, the CYL register 404 is set with the number of 3 at a step 213. Further, the softcounter is reset at a step 214 so that the content of the soft-counter is made to be in agreement with the count value CYLCONT of the counter 442 which is also reset upon the delivering of the signal CYLBF. At a step 215, the flag bit of RAM 116 is cleared to indicate the completion of the corrective fuel injection for an acceleration. Returning to the step 211, if the flag bit of RAM 116 is of logical "0", the processing for the normal fuel injection is carried out at a step 217. At a step 218, it is ready to perform another task.

According to the embodiment of the invention mentioned above, the corrective fuel injection for an acceleration is carried out at the timing different from the normal fuel injection even though the instruction for the corrective fuel injection occurs during the normal fuel injection being performed. As a result, the quantity of fuel injected into the internal combustion engine can be accurately corrected for acceleration. In the present invention, the data set into the CYL register is compared with the count values of the CYL counter and when the set data and the counted value become equal to each other, an output pulse for fuel injection control is delivered. Therefore, it is easy to change the timing of the fuel injection by selecting the data to be set into the CYL register.

(4) EGR and NIDL Controls

EGR control is defined as adjusting the valve 28 to enable the suitable amount of exhaust recirculating gas to be entered into the intake manifold 26. NIDL control is defined as adjusting the screw 44 or a valve at the idling operation to permit the suitable amount of air to be entered into the intake manifold 26. Both controls are so-called duty controls by which the pulse width of an output is changed while the interval of the output pulses remains unchanged. In order to set the width of the valve control, pulse registers 420 and 424 are provided as shown in FIG. 8A. The registers 418 and 422 are provided to set the interval of the output pulses. Since the basic operation of the EGR control is substantially the same as that of the NIDL control the following discussion will be directed to the EGR control, but also applies to the principle of operation of the NIDL control. By the stage pulse EGRP-P, the register 418 of the first register file 470 and timer 456 of the second register file 456 are selected for operation of the comparison and the incrementer 478 is applied with an increment control signal INC which is produced by means of a logic circuit shown in FIG. 16(D). As a result, the timer 456 counts up the stage pulse EGRP-P and produces an output signal shown at EGR TIMER in FIG. 25. When the count value EGR TIMER becomes equal to or greater than the set value EGRP REG, the latch circuit 536, applied with an output from the comparator 480 through the latch circuit 534, produces a signal shown at EGRPBF in FIG. 25. This signal, EGRPBF, serves together with the pulse EGRD to produce a reset signal at a control stage EGR-P. The timer 456 is commonly used at both the control stages EGR-D and EGR-P. When the count value EGR TIMER of the timer 456 becomes equal to or greater than the set value EGRD REG of the register 420, the comparator 480 produces an output which is applied to a latch circuit 538 and then to a latch circuit 540. The latch circuit 540 delivers an output signal shown at EGR out in FIG. 25. The opening and closing of EGR valve are controlled in response to the output signal EGR out thus obtained.

(5) Measurements of the Revolutions of the Engine and the Vehicular Speed

The revolutions per unit time of the engine are measured by counting, for the predetermined period of time, the number of pulses POS-P detected by means of the crank angle sensor mounted on the crank shaft. The measurement of the vehicular speed is performed by counting for the predetermined period of time the output pulses sensed by the vehicular speed sensor. Both the measurements are substantially the same in principle, therefore the description will be made of the measurement of the revolutions per minute of the engine.

Figure 25:
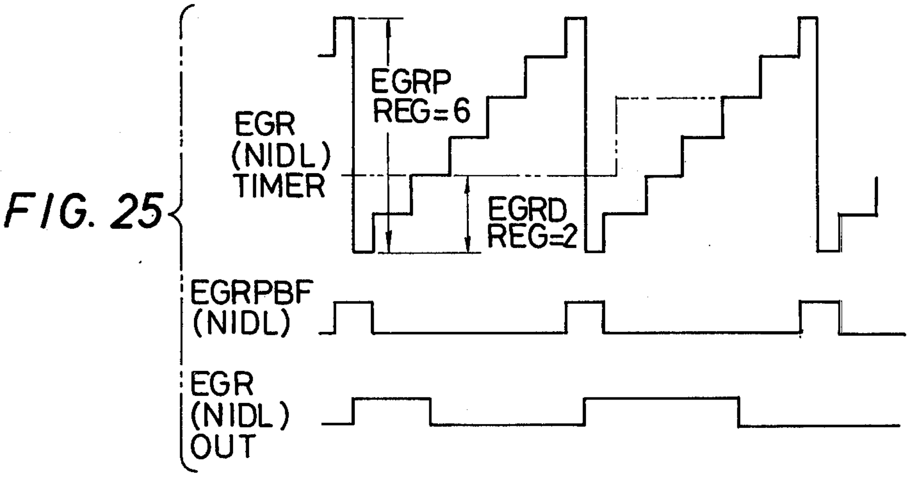
Figure 26:
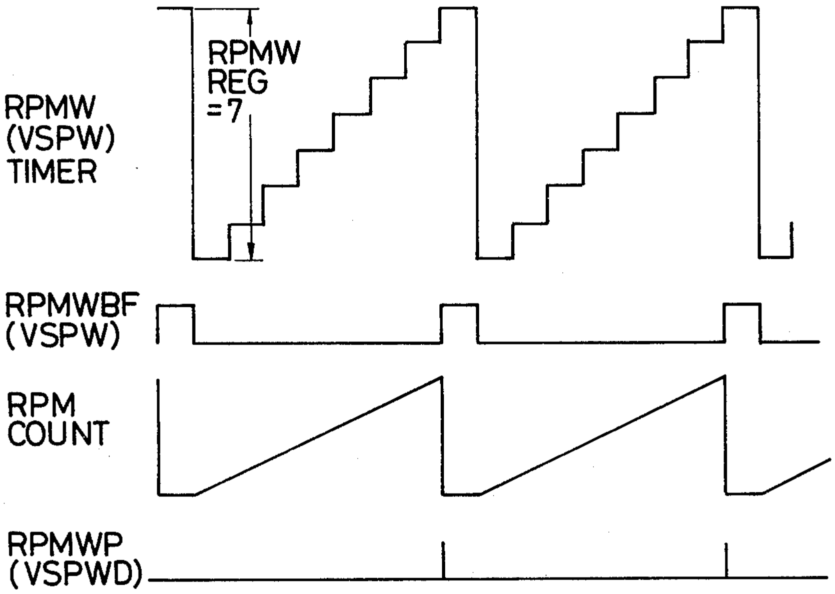

When the stage pulse RPMW-P is delivered from the microstage generator 570, the register 426 of the first register file 470 and the timer 460 of the second register file 472 are selected for operation. Upon the application of the stage pulse RPMW-P to the incrementer control circuit 490, it produces an increment control signal INC by means of a logic circuit shown in FIG. 16(E), and a reset signal RESET by means of a logic circuit shown in FIG. 17(E), both of which are applied to the incrementer 478. As a result, the timer 460 increases its count value RPMW TIMER as shown in FIG. 25. The register 426 is preliminarily set with the number of 7. When the count value RPMW TIMER of the timer 460 becomes equal to or greater than the set value RPMW REG of the register 426, the comparator 480 delivers an output which is applied to the latch circuit 550 and then shifted to the latch circuit 552. Shown at RPMWBF in FIG. 26 is one output of the latch circuit 552 which is applied to the logic circuit shown in FIG. 17(E) for producing the reset signal. Since the output logic circuit 710 shown in FIG. 18 is connected to the output stage of the latch circuit 552, and output pulse RPMWD appears at the terminal 712 of the output logic circuit 710.

When the stage pulse PRM-P is delivered, the counter 462 of the second register file 472 is selected. This counter 462 counts the pulses POS-P between two adjacent stage pulses PRM-P so that the count value RPM COUNT of the counter 462 increases as shown in FIG. 26. The count value RPM COUNT will be transferred to the third register file 474 in synchronism with a control signal MOVE produced by the incrementor control circuit 490. The set data in the third register file 474 will be transferred by way of the data bus 162 to the CPU 114.

(6) Detection of the Engine Stopping

When the revolutions of the engine become lower than a predetermined value, in other words, that the interval of the reference pulse INTLD becomes greater than the set value ENST REG of the register 410 of the first register file 470, the CPU 114 is informed by an interrupt signal of the fact that the engine will soon stop. In normal operation, the reference pulse INTLD is predetermined in cycle or interval to be less than the set value of the register 410. In the event the CPU 114 receives an interrupt signal indicating that the engine will stop, the CPU 114 generates an instruction signal for the stopping of the operation of the fuel pump and other necessary elementary operations.

Figure 27:
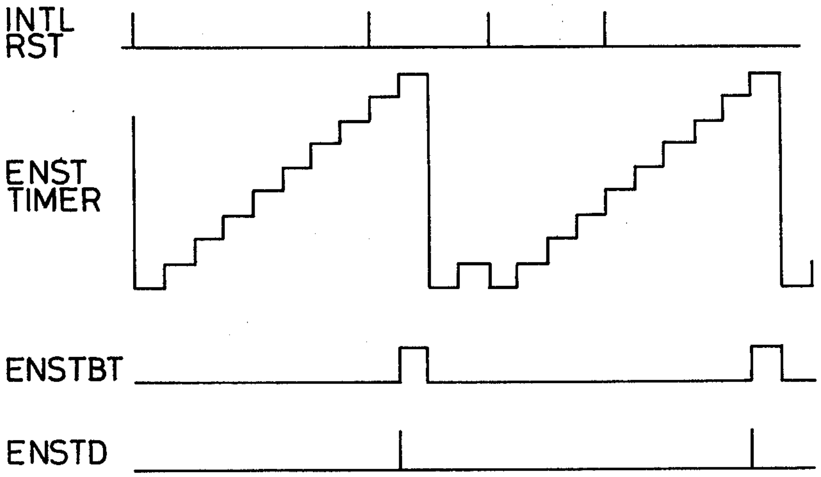

When the microstage generator 570 produces the stage pulse ENST-P, the register 410 of the first register file 470 and the timer 448 of the second register file 472 are selected for operation. At the same time, the incrementer 478 is applied with the stage pulse ENST-P as an increment control signal INC, as shown in FIG. 16(F), and a reset signal RESET produced by means of a logic circuit shown in FIG. 17(F). The timer 448 operates to count up the stage pulses ENST-P so that the count value ENST TIMER varies as shown in FIG. 27. As a consequence, a latch circuit 520 connected to the comparator through the latch circuit 518 delivers an outut shown at ENSTBF in FIG. 27. By the connection of the same logic circuit 710 as in FIG. 18 to the output stage of the latch circuit 518, an output pulse ENSTD indicating the condition of the engine stop can be obtained at the terminal 712 of the logic circuit 710. In normal operation, the timer 448 is reset by a pulse INTLRST shown in FIG. 27. This pulse INTLRST is produced with the reference pulse INTLD being made in synchronism with the stage pulse ENST-P. When the engine is near the condition of stop, the timer 448 is reset by the output ENSTBF of the latch circuit 518 and the above-mentioned pulse INTLRST. The interval between the pulse INTLRST and the output pulse ENSTD is referred to as a so-called ENST time.

Since various changes in the control apparatus embodied in the present invention may be made without departing from its spirit and scope, it is intended that all matters in the above description shall be considered as illustrative and not in a limiting sense.

It should be noted that the various elements discussed above such as the CPU 114, the RAM 116, the ROM 118, and the various registers could readily be constructed and programmed to perform the above-described operations by one of ordinary skill in the art.

We claim:

1. A control apparatus for an internal combustion engine comprising:

first means for generating a pulse train having a predetermined relation to the angle of rotation of the engine crankshaft, said pulse train including a plurality of reference pulses generated within each time period corresponding to one revolution of the engine crankshaft;

second means for generating a normal fuel injection signal, to control a fuel injector, the time of occurrence of which signal depends upon the time of occurrence of one of said reference pulses;

third means for detecting an accelerating engine condition;

fourth means, coupled to said third means, for detecting whether the accelerating condition has occurred at a time between said one of the reference pulses and an adjacent subsequent reference pulse; and fifth means for generating a corrective fuel injection signal, the initiation of which is governed by a subsequent to said adjacent subsequent reference pulse in response to the detected information from said fourth means, so that said corrective fuel injection signal does not overlap the normal fuel injection signal.

2. A control apparatus for an internal combustion engine comprising:

first means for generating a pulse train having a predetermined relation to the angle of rotation of the engine crankshaft, said pulse train including first to Nth reference pulses generated within each time period corresponding to one revolution of the engine crankshaft, where N is an integer greater than one;

second means for generating a normal fuel injection signal in timed relationship to the first reference pulse to control a fuel injector;

third means for detecting an accelerating engine condition;

fourth means, coupled to said third means, for detecting whether the time of occurrence of the detected accelerating condition is between the first reference pulse and a second reference pulse or between the second reference pulse and the Nth reference pulse; and fifth means for generating a corrective fuel injection signal in synchronism with said second reference pulse when the time of occurrence of the detected accelerating condition is between the first and second reference pulses, and for generating a corrective fuel injection signal immediately upon detecting said accelerating engine condition, when the time of occurrence thereof occurs between the second and Nth reference pulses.

3. A control apparatus for an internal combustion engine as defined in one of claims 1 or 2, wherein said first means comprises:

means for producing a pulse indicative of a predetermined angle of rotation of the engine crankshaft;

a register for storing a predetermined value corresponding to said predetermined angle of rotation;

a stage pulse generator for producing stage pulses at equal intervals;

a counter for counting the stage pulses produced by said stage pulse generator;

a comparator for comparing the stored predetermined value and the counter output indicating the number of stage pulses; and means for determining when the comparator indicates that the counter pulse is equal to or greater than the stored predetermined value to generate the reference pulses.

4. A control apparatus for an internal combustion engine as defined in one of claims 1 or 2, wherein said third means comprises means for producing a signal indicative of the throttle position of a throttle valve.

5. A control apparatus for an internal combustion engine as defined in one of claims 1 or 2, wherein said third means comprises means for measuring the amount of air flow into the cylinders of the engine.

6. A control apparatus for an internal combustion engine as defined in one of claims 1 or 2, wherein said second means comprises:

a first register for storing predetermined data;

a first counter for counting up the reference pulses which are produced by said first means each time the engine crankshaft rotates a fixed crank angle;

a comparator for comparing said predetermined data with the count value of said first counter;

a second register for storing data representative of the time duration of the pulse to be supplied to an actuator which controls the quantity of fuel to be injected into the internal combustion engine;

a pulse generator for producing stage pulses at predetermined intervals; and timer means which counts up the stage pulses and is reset in response to the output of the comparator, the data of the second register and the count value of the timer being applied to the comparator and the resultant output being used as the normal fuel injection signal.

7. A control apparatus as defined in claim 6, wherein the data set into the first register is determined by the number of cylinders of the internal combustion engine.

8. A control apparatus as defined in claim 6, wherein said fifth means comprises means for changing the data stored in the first register into data which is less than the predetermined data, upon the detection of the accelerating engine condition.

9. A control apparatus as defined in claim 8, wherein said fifth means comprises means for changing the data stored in the first register into the number of "1" when the accelerating engine is detected.

10. A method of controlling the supply of fuel to an internal combustion engine so as to augment the supply of fuel normally supplied to the engine, in the event of an acceleration condition, comprising the steps of:

(a) generating a train of pulses in accordance with the rotation of the engine crankshaft, said train of pulses containing a plurality of reference pulses for every one revolution of the engine crankshaft;

(b) generating a first fuel supply signal to control the normal supply of fuel to the engine, the time of occurrence of which is governed by one of said reference pulses;

(c) detecting an acceleration condition of the engine;

(d) detecting whether the occurrence of the acceleration condition of the engine has occurred at a time between said one of said reference pulses and a subsequent adjacent reference pulse; and (e) generating a second fuel supply signal the time of occurrence of which is synchronized with or subsequent to said subsequent adjacent reference pulse, whereby the supply of fuel to the engine is augmented so as not to overlap the normal supply of fuel to the engine.

11. A method of controlling the supply of fuel to an internal combustion engine so as to augment the supply of fuel normally supplied to the engine, in the event of an acceleration condition, comprising the steps of:

(a) generating a train of pulses in accordance with the rotation of the engine crankshaft, said train of pulses containing a plurality of first through Nth reference pulses for every one revolution of the engine crankshaft, N being an integer greater than one;

(b) generating a first fuel supply signal to control the normal supply of fuel to the engine, the time of occurrence of which is governed by one of said reference pulses;

(c) detecting an acceleration condition of the engine;

(d) detecting whether the occurrence of the acceleration condition of the engine has occurred at a time between said first reference pulse and a second reference pulse or between said second reference pulse and the Nth reference pulse; and (e) generating a second fuel supply signal the time of occurrence of which is synchronized with said second reference pulse in response to the time of occurrence of the acceleration condition being between the first and second reference pulses, but whereas the time of occurrence of which coincides with the detection of the acceleration condition of the engine in response to the time of occurrence of the acceleration condition being between the second and Nth reference pulses, whereby the supply of fuel to the engine is augmented so as not to overlap the normal supply of fuel to the engine.

12. A method according to claim 11, wherein step (d) comprises the steps of:

(d1) successively changing the value of a reference number in accordance with successive ones of said reference pulses;

(d2) comparing the current value of said reference number with a prescribed value upon detecting an acceleration condition of the engine; and (d3) detecting whether the occurrence of the acceleration condition of the engine has occured at a time between said first reference pulse and a second reference pulse or between said second reference pulse and the Nth reference pulse in dependence upon whether the current value of said reference number exceeds said prescribed value.

13. A method according to claim 12, further comprisng the steps of (f) resetting the value of said reference number to a prescribed initial value.

* * * * *